(12) United States Patent
Fang et al.

(10) Patent No.: US 10,638,133 B2
(45) Date of Patent: Apr. 28, 2020

(54) DELTA QUANTIZATION PARAMETER (QP) CODING OPTIONS FOR VIDEO

(71) Applicant: QUALCOMM Incorporated, San Diego, CA (US)

(72) Inventors: Xue Fang, San Diego, CA (US); Srikanth Alaparthi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/885,222

(22) Filed: Jan. 31, 2018

(65) Prior Publication Data

US 2019/0238849 A1 Aug. 1, 2019

(51) Int. Cl.

| H04N 19/126 | (2014.01) |
|---|---|
| H04N 19/186 | (2014.01) |
| H04N 19/176 | (2014.01) |
| H04N 19/96 | (2014.01) |
| H04N 19/124 | (2014.01) |
| H04N 19/167 | (2014.01) |
| H04N 19/147 | (2014.01) |
| H04N 19/184 | (2014.01) |

(52) U.S. Cl.
CPC ......... *H04N 19/126* (2014.11); *H04N 19/124* (2014.11); *H04N 19/147* (2014.11); *H04N 19/167* (2014.11); *H04N 19/176* (2014.11); *H04N 19/184* (2014.11); *H04N 19/186* (2014.11); *H04N 19/96* (2014.11)

(58) Field of Classification Search
CPC ... H04N 19/124; H04N 19/147; H04N 19/184
See application file for complete search history.

(56) References Cited

U.S. PATENT DOCUMENTS

| 8,767,834 B2* | 7/2014 | Segall | H04N 19/176 |
|---|---|---|---|
| | | | 375/240.23 |
| 2007/0263720 A1* | 11/2007 | He | H04N 19/124 |
| | | | 375/240.03 |

(Continued)

OTHER PUBLICATIONS

International Search Report and Written Opinion—PCT/US2019/015529—ISA/EPO—dated Mar. 22, 2019.

(Continued)

*Primary Examiner* — Shawn S An
(74) *Attorney, Agent, or Firm* — Kilpatrick Townsend & Stockton

(57) ABSTRACT

Techniques and systems are provided for processing video data. For example, an apparatus (e.g., a coding device, such as an encoder) can receive a residual portion of a block of a frame of the video data. The block is a first block in a row of the frame. The apparatus can receive a quantization parameter (QP) value determined for the residual portion of the block, and can determine all transform coefficients of the residual portion of the block have zero values. The transform coefficients can include quantized transform coefficients. The device can compare the received QP value determined for the residual portion of the block to a threshold QP value, and can determine a final QP value for the residual portion of the block based on whether the received QP value is greater than the threshold QP value.

27 Claims, 13 Drawing Sheets

(56) References Cited

U.S. PATENT DOCUMENTS

| | | | | |
|---|---|---|---|---|
| 2010/0290533 | A1* | 11/2010 | Minagawa | H03M 7/40 |
| | | | | 375/240.23 |
| 2012/0082218 | A1* | 4/2012 | Misra | H04N 19/197 |
| | | | | 375/240.12 |
| 2013/0188725 | A1* | 7/2013 | Wang | H04N 19/176 |
| | | | | 375/240.18 |
| 2015/0215621 | A1 | 7/2015 | Liu et al. | |
| 2015/0215637 | A1* | 7/2015 | Trudeau | H04N 19/567 |
| | | | | 375/240.16 |
| 2015/0288965 | A1* | 10/2015 | Li | H04N 19/124 |
| | | | | 375/240.03 |
| 2015/0350290 | A1* | 12/2015 | Yang | H04L 65/80 |
| | | | | 348/14.02 |
| 2016/0007023 | A1 | 1/2016 | Novotny | |
| 2016/0057418 | A1* | 2/2016 | Lei | H04N 19/124 |
| | | | | 375/240.03 |
| 2016/0191937 | A1 | 6/2016 | Döffinger et al. | |
| 2017/0026645 | A1 | 1/2017 | Zhou et al. | |
| 2017/0280139 | A1 | 9/2017 | Thirumalai et al. | |

OTHER PUBLICATIONS

Kim J.H., et al., "CE4 Subtest 3.1.b: Additional Constraint for QP Adaptation at Sub_CU Level", 8. JCT-VC Meeting, 99. MPEG Meeting, Jan. 2, 2012-Oct. 2, 2012, San Jose, (Joint Collaborative Team on Video Coding of ISO/IEC JTC1/SC29/WG11 and ITU-T SG.16), URL: https://www.itu.int/wftp3/AV-ARCH/JCTVC-SITE/, No. JCTVC-H0508, Jan. 22, 2012 (Jan. 22, 2012), pp. 1-3, XP030111535.

Tae Oh B., et al., "3D-CE2.a Results on Adaptive Depth Quantization by Samsung", 100. MPEG Meeting, Apr. 30, 2012-May 4, 2012, GENEVA, (Motion Picture Expert Group OR ISO/IEC JTC1/SC29/WG11), No. m24820, Apr. 25, 2012 (Apr. 25, 2012), 4 Pages, XP030053163.

\* cited by examiner

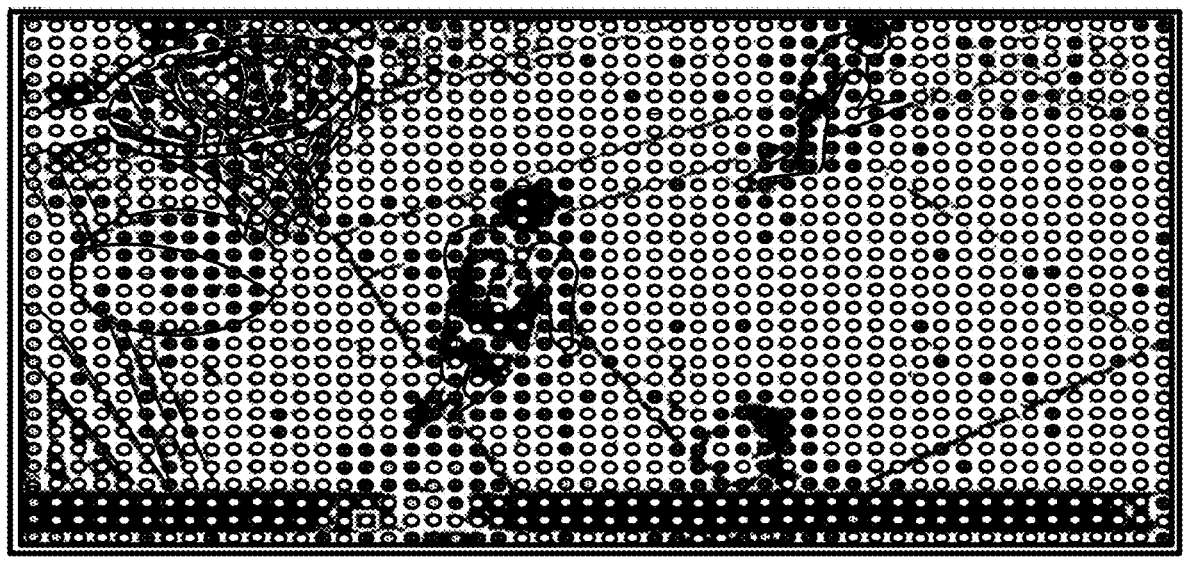
FIG. 6
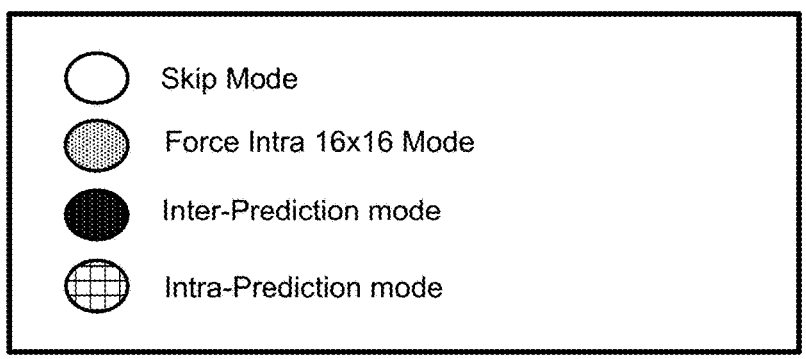

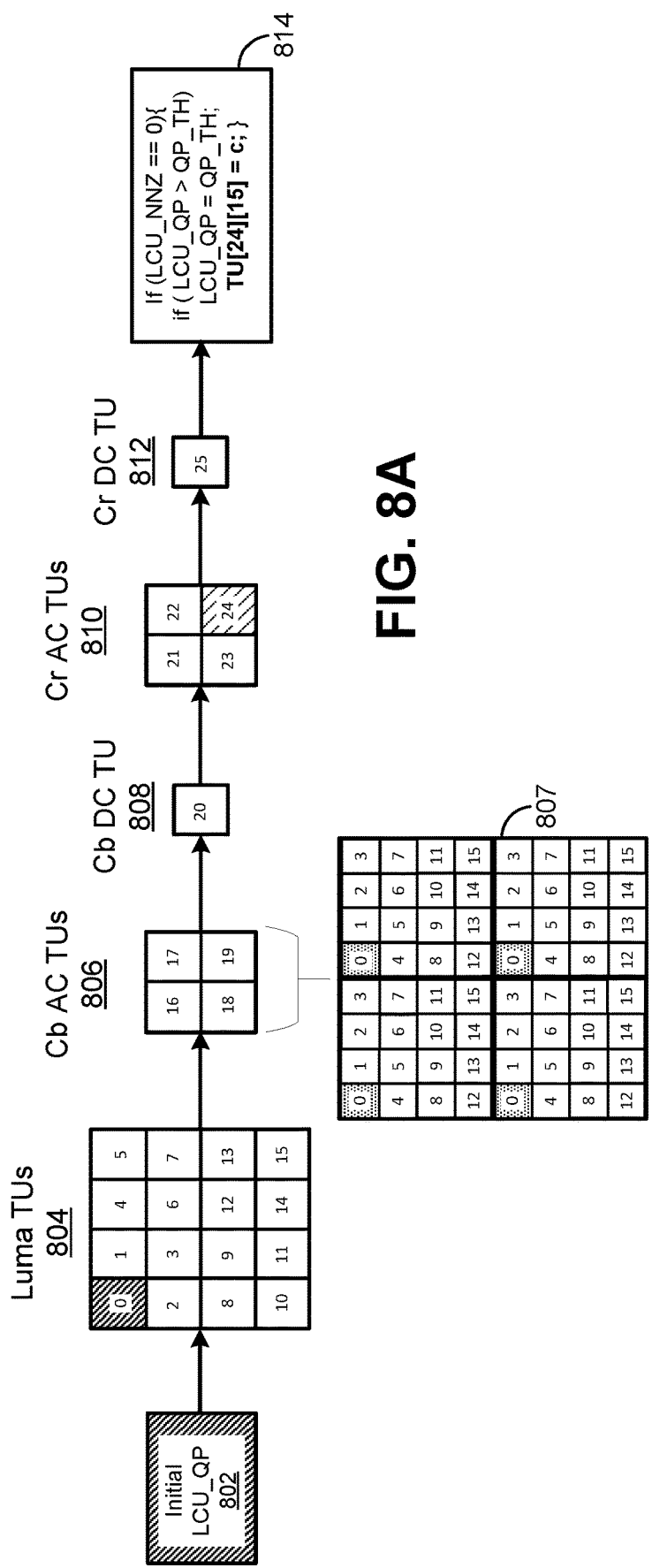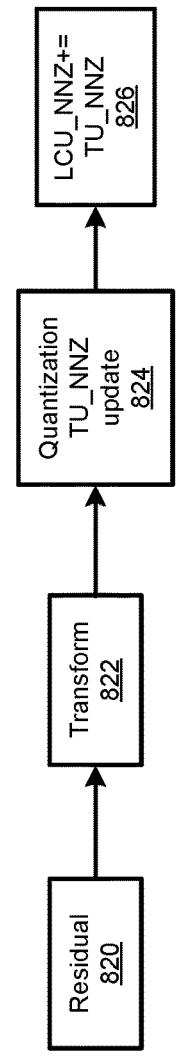
FIG. 8A
FIG. 8B

FIG. 11A Noise Values 1108A, Frame 1

| 0 | 1 | -1 | 0 |
|---|---|---|---|
| 1 | -2 | 2 | -1 |
| -1 | 2 | -2 | 1 |
| 0 | -1 | 1 | 0 |

FIG. 11B Noise Values 1108B, Frame 2

| 0 | 2 | -2 | 0 |
|---|---|---|---|
| 2 | -4 | 4 | -2 |
| -2 | 4 | -4 | 2 |
| 0 | -2 | 2 | 0 |

FIG. 11C Noise Values 1108C, Frame 3

| 0 | 3 | -3 | 0 |
|---|---|---|---|
| 3 | -6 | 6 | -3 |
| -3 | 6 | -6 | 3 |
| 0 | -3 | 3 | 0 |

FIG. 11D Noise Values 1108D, Frame 4

| 0 | 4 | -4 | 0 |
|---|---|---|---|
| 4 | -8 | 8 | -4 |
| -4 | 8 | -8 | 4 |
| 0 | -4 | 4 | 0 |

FIG. 12A Noise Values 1208A, Frame 1

| 0 | 1 | -1 | 0 |
|---|---|---|---|
| 1 | -2 | 2 | -1 |
| -1 | 2 | -2 | 1 |
| 0 | -1 | 1 | 0 |

FIG. 12B Noise Values 1208B, Frame 2

| 0 | -1 | 1 | 0 |
|---|---|---|---|
| -1 | 2 | -2 | 1 |
| 1 | -2 | 2 | -1 |
| 0 | 1 | -1 | 0 |

FIG. 12C Noise Values 1208C, Frame 3

| 0 | 1 | -1 | 0 |
|---|---|---|---|
| 1 | -2 | 2 | -1 |
| -1 | 2 | -2 | 1 |
| 0 | -1 | 1 | 0 |

FIG. 12D Noise Values 1208D, Frame 4

| 0 | -1 | 1 | 0 |
|---|---|---|---|
| -1 | 2 | -2 | 1 |
| 1 | -2 | 2 | -1 |
| 0 | 1 | -1 | 0 |

DELTA QUANTIZATION PARAMETER (QP) CODING OPTIONS FOR VIDEO

FIELD

This application is related to video coding and compression. More specifically, this application relates to delta quantization parameter (QP) coding options for video.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bitrate, while avoiding or minimizing degradations to video quality. With ever-evolving video services becoming available, encoding techniques with better coding efficiency are needed.

BRIEF SUMMARY

Techniques and systems are described herein for providing delta quantization parameter (QP) coding options for video data. The techniques and systems can be implemented by changing the existing hardware design of coding devices (e.g., a video encoding device, a video decoding device, and/or a combined video encoder-decoder, or CODEC), such as by changing the existing firmware of the coding devices and/or changing the existing software used by the coding devices. In general, a delta QP can be transmitted for video data to allow for QP changes within a video frame (also referred to as a video picture) at a block level (e.g., at a largest coding unit (LCU) level or other suitable block level change). For instance, the quantization step size (corresponding to a certain QP value) may be changed within a frame in certain cases, such as when rate control and/or perceptual quantization (PQ) are performed.

In some cases, the delta QP coding options described herein can be provided for the first coding block (e.g., LCU or other coding block) of each row of a frame. For example, the delta QP coding options can include lowering of the QP value for the first LCU in each row of a frame based on a threshold QP. The delta QP coding options can also include forced insertion of a non-zero coefficient (e.g., a +1 or a −1) at a transform unit (TU) (e.g., the last TU or other suitable TU) of the first coding block (e.g., LCU or the like) of each row of the frame. In some cases, the delta QP coding options can include alternating the inserted coefficient at each frame. For example, the delta QP coding options can include inserting a +1 in a first frame, a −1 in a next frame, a +1 in the subsequent frame, and so on. Alternating the coefficient counterbalances the temporal error propagation that results from frame to frame.

In some examples, the techniques and systems can apply the forced non-zero coefficient insertion and/or the QP-threshold based QP determination for a coding block (e.g., LCU or the like) only when one or more conditions are met. For example, such techniques can be applied only when a coding mode is used that results in multiple QP values being generated for a single frame. Examples of such coding modes can include an LCU rate control (RC) mode and a perceptual quantization (PQ) mode. In some cases, the techniques are only applied when all transform coefficients of the coding block have zero values. Further, in some cases, the techniques are only applied when the QP value for a coding block (e.g., a first LCU of a row) cannot be determined based on another coding block (e.g., the last LCU of the previous row). Illustrative examples of when such a situation can occur is when synthetic tiles or a multi-pipe encoder are used. In some examples, the techniques are only applied when one or more of the above conditions are met. In some cases, zero block detection (ZBD) (which is used to force all coefficients of an LCU to 0 values) is disabled for a coding block (e.g., an LCU or the like) when the methods described herein are performed for the coding block.

According to at least one example, a method of processing video data is provided. The method comprises receiving a residual portion of a block of a frame of the video data, the block being a first block in a row of the frame. The method further comprises receiving a quantization parameter (QP) value determined for the residual portion of the block. The method further comprises determining all transform coefficients of the residual portion of the block have zero values. The method further comprises comparing the received QP value determined for the residual portion of the block to a threshold QP value, and determining a final QP value for the residual portion of the block based on whether the received QP value is greater than the threshold QP value.

In another example, an apparatus for processing video data is provided that includes a memory configured to store video data and a processor. The processor is configured to and can receive a residual portion of a block of a frame of the video data, the block being a first block in a row of the frame. The processor is configured to and can receive a quantization parameter (QP) value determined for the residual portion of the block. The processor is configured to and can determine all transform coefficients of the residual portion of the block have zero values. The processor is configured to and can compare the received QP value determined for the residual portion of the block to a threshold QP value. The processor is configured to and can determine a final QP value for the residual portion of the block based on whether the received QP value is greater than the threshold QP value.

In another example, a non-transitory computer-readable medium is provided having stored thereon instructions that, when executed by one or more processors, cause the one or more processors to: receive a residual portion of a block of a frame of the video data, the block being a first block in a row of the frame; receive a quantization parameter (QP) value determined for the residual portion of the block; determine all transform coefficients of the residual portion of the block have zero values; compare the received QP value determined for the residual portion of the block to a threshold QP value; and determine a final QP value for the residual portion of the block based on whether the received QP value is greater than the threshold QP value.

In another example, an apparatus for processing video data is provided. The apparatus includes means for receiving a residual portion of a block of a frame of the video data, the block being a first block in a row of the frame. The apparatus further includes means for receiving a quantization parameter (QP) value determined for the residual portion of the block. The apparatus further includes means for determining all transform coefficients of the residual portion of the block have zero values. The apparatus further includes means for comparing the received QP value determined for the residual portion of the block to a threshold QP value, and means for determining a final QP value for the residual portion of the block based on whether the received QP value is greater than the threshold QP value.

In some aspects, the final QP value for the block is determined to be equal to the threshold QP value when the received QP value is greater than the threshold QP value. In some aspects, the final QP value for the block is determined to be equal to the received QP value when the received QP value is not greater than the threshold QP value.

In some aspects, the method, apparatuses, and computer-readable medium described above may further comprise inserting a non-zero coefficient value at a transform unit corresponding to a component of the residual portion of the block. In some examples, the transform unit is the last transform unit position of the chroma red (Cr) component on the residual portion of the block. In some cases, a sign of the non-zero coefficient value added to the last transform unit of the residual portion of the bock is alternated from frame to frame.

In some aspects, the method, apparatuses, and computer-readable medium described above may further comprise: encoding the final QP value for the block into an encoded video bitstream. In some examples, the final QP value for the block is encoded into the encoded video bitstream as a delta QP value. The delta QP value indicates a difference between the final QP value for the block and a QP value of a previous block.

In some aspects, the block of the frame of video data includes a largest coding unit (LCU). For instance, the block of the frame of video data can include a coding tree unit (CTU) or coding tree block (CTB), a macroblock, or other suitable LCU.

In some aspects, the apparatus comprises a camera for capturing one or more video frames. In some examples, the apparatus comprises a mobile device with a camera for capturing one or more video frames.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6 is a diagram illustrating an example of a video frame with LCUs coded using different coding modes, in accordance with some examples;

FIG. 8A is a block diagram illustrating the forced non-zero coefficient insertion and the QP threshold-based QP determination process, in accordance with some examples;

FIG. 8B is a block diagram illustrating an example of a hardware update for implementing the forced non-zero coefficient insertion and the QP threshold-based QP determination process, in accordance with some examples;

FIG. 11A, FIG. 11B, FIG. 11C, and FIG. 11D are diagrams illustrating noise values for the same LCU across four frames when the sign of the non-zero coefficient is not alternated, in accordance with some examples;

FIG. 12A, FIG. 12B, FIG. 12C, and FIG. 12D are diagrams illustrating noise values for the same LCU across four frames when the sign of the non-zero coefficient is alternated, in accordance with some examples;

DETAILED DESCRIPTION

Figure 1:
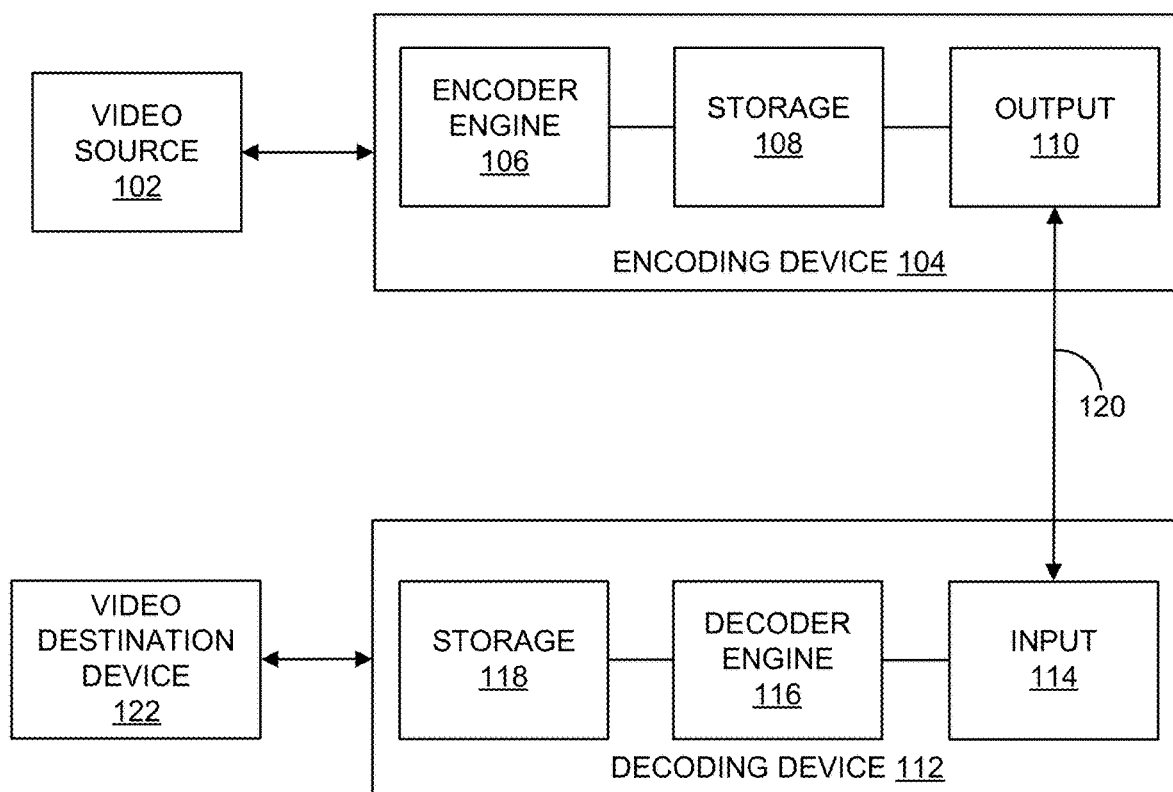
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As described in more detail below, coding of video data can include partitioning a video frame (or "picture") into coding blocks. For example, a quadtree structure can be used for partitioning video frames, which can include largest coding units (LCUs), coding tree units (CTUs), or the like, and sub-blocks thereof (e.g., coding units (CUs), prediction units (PU), transform units (TU), among others). As used herein, a LCU refers to the largest coding unit according to a particular coding standard. Examples of LCUs include macroblocks, CTUs, among other coding units.

A predictive block is generated for a current coding block (using either inter-prediction or intra-prediction), and includes a coding block that is found to closely match the current coding block. A residual coding block can then be generated by subtracting the predictive block from the current coding block. The residual video data in the residual coding block may be included in one or more TUs. The residual video data can then be transformed (by a transform and quantization engine) into residual transform coefficients using a transform (e.g., a discrete cosine transform (DCT) or a conceptually similar transform).

The resulting transform coefficients can be quantized to further reduce the bitrate. The degree of quantization may be modified by adjusting a quantization parameter (QP). The QP indicates a quantization step size for a frame during quantization, and controls how much spatial detail is retained from the captured image after quantization. As the QP value becomes smaller, more detail is retained, leading to better video quality and a higher picture size. As QP increases, more of the detail is aggregated so that the bitrate drops, leading to loss of quality and a smaller picture size.

A delta QP can be transmitted to allow for QP changes within a video frame at a block level (e.g., at an LCU level, a CTU level, a macroblock level, or other suitable block level change). For instance, the quantization step size (corresponding to a certain QP value) may be changed within a frame in certain cases, such as when LCU rate control (LCU RC) and/or perceptual quantization (PQ) are performed. The delta QP indicates the difference in QP values between neighboring LCUs.

In some examples, one or more systems and methods are described herein that are directed to providing delta QP coding options for video data. For example, as described in more detail below, the QP value for a particular coding block (e.g., LCU or the like) of a frame of video can be limited based on a threshold QP value. Such a limitation on the QP value may be applied only to certain coding blocks in some cases. For instance, in some examples, only the first LCU of each row of a frame may have its QP value limited based on the threshold QP value. In some examples, the delta QP coding options can include a forced insertion of a non-zero coefficient (e.g., a +1 or a −1) at a transform unit (TU) corresponding to a component of the frame. For instance, the non-zero coefficient can be forcibly inserted at a last TU of the first LCU of each row of the frame. In some cases, the sign of the inserted non-zero coefficient can be alternated at each frame.

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many examples described herein are described with respect to the AVC standard, the HEVC standard, and/or extensions thereof. However, the techniques and systems described herein may also be applicable to other coding standards, such as MPEG, the JEM model, extensions thereof, and/or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). In some cases, a TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). Reference pictures can also be referred to as reference frames. The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

The output 110 of the encoding device 104 may send or transmit the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™ radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 14. An example of specific details of the decoding device 112 is described below with reference to FIG. 15.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, video frames are typically partitioned into coding blocks when being coded. The coding blocks can include largest coding units (LCUs), or other suitable blocks of a video frame or picture. As used herein, an LCU refers to the largest coding unit according to a particular coding standard. Examples of LCUs include macroblocks, CTUs, among other coding units. The LCUs can be further partitioned into smaller and smaller blocks. Each coding block (e.g., LCU, CTU, sub-block thereof, or the like) can then be processed using a coding mode. Coding modes can include intra-prediction coding modes (using image data of the current frame for prediction) and inter-prediction coding modes (using image data of other frames for prediction). A predictive block is generated for a current video block (using either inter-prediction or intra-prediction), and includes a block that is found to closely match the current video block.

A residual video block can then be generated by subtracting the predictive block from the current video block. The residual video data in the residual video block may be included in one or more transform units (TUs). The residual video data can then be transformed (e.g., by a transform and quantization engine of the encoder) into residual transform coefficients using a transform function. For instance, the residual video data can be converted from a pixel domain to a transform domain (e.g., a frequency domain) using the transform. A transform can include a discrete cosine transform (DCT), a discrete sine transform (DST), or a conceptually similar transform. In one illustrative example, a transform and quantization engine can use two-dimensional transforms of various sizes (e.g., from 4×4 to 32×32) that are finite precision approximations to the DCT. In another illustrative example, the transform and quantization engine can use a 4×4 integer transform based on the DST for use with 4×4 luma intra-prediction residual blocks. Any other suitable transforms can also be used.

The resulting transform coefficients can be quantized to generate quantized coefficients, which further reduces the bitrate. The degree of quantization may be modified by adjusting a quantization parameter (QP). The QP indicates a quantization step size for a frame during quantization, and controls how much spatial detail is retained from the captured image after quantization. In one illustrative example, a QP in the range of 0-51 (for 8-bit video sequences) can be mapped to a quantizer step size that doubles each time the QP value increases by 6. Small values of QP more accurately approximate the spatial frequency spectrum of a picture, which requires more bits. For instance, as the QP value becomes smaller, more detail is retained, leading to better video quality and a higher picture size. Large values of QP represent large steps that approximate the spatial transform, so that most of the signal can be captured by fewer coefficients. For instance, as QP increases, more of the detail is aggregated so that the bitrate drops, leading to loss of quality and a smaller picture size.

A delta QP can be used to indicate the difference in QP values between neighboring coding blocks (e.g., LCUs or the like). For example, for each coding block, a differential QP (called "delta QP") can be coded, and is equal to the absolute QP of the current block minus the previously encoded QP of a previously encoded block (e.g., denoted as delta QP=Current LCU QP−last LCU QP). The delta QP can be positive or negative. Using the QP value reduces the number of bits as compared with using the actual QP of the current block. For instance, if the last QP of the previous block is 34, and the current QP of the current block is 35, the delta QP for the current block is 1. Coding the delta QP of 1 uses 2 bits, while coding the current QP of 35 requires the use of more than 10 bits.

A delta QP can be transmitted for a coding block to allow for QP changes within a video frame at a block level (e.g., at an LCU level, a CTU level, or other suitable block level change). The concept of a delta QP is thus used when QP values are varied at the block level. For instance, in certain cases, the quantization step size (corresponding to a certain QP value) may be varied for different coding blocks within a frame. Video encoders can adapt the QPs of coding blocks for visual quality optimization, for rate control, and/or for any other suitable purpose. For instance, as noted above, the QP value utilized by a video coder has a significant impact on the number of bits used to represent video data. In one illustrative example, a higher QP can result in fewer bits being used when compared to a lower QP. Due to the relatively limited bandwidth between a transmitting device (e.g., with a video encoder) and a receiving device (e.g., with a video decoder), the transmitting device can control the data rate (bits per period of time) based on the QP used for the video data, effectively controlling the amount of information that must be communicated via the link.

In some examples, video encoders can perform LCU rate control (LCU RC) and/or perceptual quantization (PQ, also referred to as "adaptive quantization") to adapt QP values for different coding blocks of a frame. In one illustrative example, bitrate can be controlled by adapting a QP of an LCU (or other coding block) based on target bit allocation, LCU RC, and/or PQ. Target bit allocation estimates the number of bits available to code the next frame (or picture), and can be performed before coding the frame. Using a virtual buffer, the LCU RC sets the reference value of the QP for each LCU (or other coding block) of a frame. Using LCU RC, a bitrate of a given LCU can be chosen by changing the reference QP value determined for that LCU. For example, for a current LCU that is currently being processed, it can be determined that there are too many bits or too few bits (e.g., based on a fullness of the virtual buffer), in which case the reference QP value determined for a next LCU can be adjusted in order to decrease or increase the number of bits for the next LCU. In some cases, LCU RC can be performed alone (without performing PQ) in order to determine the QP value used for an LCU. In some cases, PQ can be used to modulate the reference value of the reference QP (from the LCU RC) according to the spatial activity in the LCU to derive the value of the QP that is to be used to quantize the LCU (or other coding block). The PQ can change the QP value between LCUs based on the quality of the picture at the LCU locations. For instance, the LCUs (or other coding blocks) in the areas of a frame that have less complexity (e.g., less motion, less textured (flatter areas), or the like) can be given lower QP values (and thus more bits, leading to higher quality) than the QP values of LCUs in more complex areas of the frame (e.g., that have more motion, that are more textured, or the like). Using different QP values according to a complexity of the frames can be based on the tendency of viewers to focus more on less busy areas of the pictures than busier areas.

Illustrative examples of target bit allocation, rate control, and perceptual quantization are now described. For bit allocation, a complexity estimation can be performed. For example, after a picture or LCU of a certain type (I, P, or B) is encoded, the global complexity measure of each picture or LCU (denoted as Xi, Xp, or Xb) is updated as:

$X_i = S_i Q_i,$ $X_p = S_p Q_p,$ $X_b = S_b Q_b,$ where the terms Si, Sp, Sb are the number of bits generated by encoding each respective picture or LCU, and the terms Qi, Qp and Qb are the average quantization parameters computed by averaging the actual quantization values used during the encoding of all the LCUs in a picture (or blocks within an LCU), including the skipped LCUs. In one illustrative example, initial values for Xi, Xp, and Xb can be set to (where bitrate (bit rate) is measured in bits/s):

$$Xi = \frac{(160 * \text{bit\_rate})}{115}$$

$$Xp = \frac{(60 * \text{bit\_rate})}{115}$$

$$Xb = \frac{(42 * \text{bit\_rate})}{115}$$

A next step in the bit allocation process can include bit target setting for a next picture in a group of pictures or a next LCU in a picture. For example, the target number of bits for the next picture or LCU (Ti, Tp, or Tb) can be computed as:

$$T_i = \max\left\{\frac{R}{\left(1 + \frac{N_p X_p}{X_i X_p} + \frac{N_b X_b}{X_i K_b}\right)}, \frac{\text{bit\_rate}}{8 \times \text{picture\_rate}}\right\},$$

$$T_p = \max\left\{\frac{R}{\left(N_p + \frac{N_b K_p X_b}{K_b X_p}\right)}, \frac{\text{bit\_rate}}{8 \times \text{picture\_rate}}\right\}, \text{ and}$$

$$T_b = \max\left\{\frac{R}{\left(N_b + \frac{N_p K_b X_p}{K_p X_b}\right)}, \frac{\text{bit\_rate}}{8 \times \text{picture\_rate}}\right\}$$

where Kp and Kb are universal constants dependent on the quantization matrices used. In one illustrative example, Kp=1.0 and Kb=1.4. The term R is the remaining number of bits assigned to the group of pictures (for pictures) or the picture (for LCUs). The term R can be updated. For example, after encoding a picture or LCU, R=R−Si,p,b, where the term Si,p,b is the number of bits generated in the picture or LCU that was just encoded (picture or LCU type is I, P or B). Before encoding the first picture in a group of pictures or a first LCU in a picture (which is typically an I-type picture or LCU), R=G+R, and $$G = \frac{\text{bit\_rate} * N}{\text{picture\_rate}}.$$

The term N is the number of pictures in the group of pictures or the number of LCUs in the picture. At the start of the sequence R=0. Np and Nb are the number of P-pictures and B-pictures remaining in the current group of pictures in the encoding order, or the number of remaining P-type and B-type LCUs.

Rate control (frame-level rate control or LCU rate control) can then be performed. Before encoding LCU j (j>=1), the fullness of the appropriate virtual buffer can be computed according to the following:

$$d_j^i = d_0^i + B_{j-1} - \left(\frac{T_i \times (j-1)}{\text{MB\_cnt}}\right)$$

$$d_j^p = d_0^p + B_{j-1} - \left(\frac{T_p \times (j-1)}{\text{MB\_cnt}}\right)$$

-continued $$d_j^b = d_0^b + B_{j-1} - \left(\frac{T_b \times (j-1)}{MB\_cnt}\right),$$

depending on the type of LCU or picture. The terms $d_0^i$, $d_0^p$, and $d_0^b$ are the initial fullness of virtual buffers, with one term for each type of LCU or picture. The term Bj is the number of bits generated by encoding all LCUs in the picture (or all blocks in an LCU) up to and including the current LCU j (or block). MB_cnt is the number of LCUs in the picture (or number of blocks in an LCU). The terms $d_j^i$, $d_j^p$, and $d_j^b$ are the fullness of the virtual buffers at LCU j, each term being for each different LCU or picture type. The final fullness of the virtual buffer ($d_j^i$, $d_j^p$, $d_j^b$: j=MB_cnt) is used as $d_0^i$, $d_0^p$, $d_0^b$ for encoding the next LCU or picture of the same type.

The rate control process can then compute the reference quantization parameter Qj for the LCU j as follows:

$$Q_j = \left(\frac{d_j \times 31}{r}\right)$$

where r is a reaction parameter, and is given by:

$$r = 2 \times \frac{bit\_rate}{picture\_rate}$$

The term dj is the fullness of the appropriate virtual buffer. The initial value for the virtual buffer fullness is:

$$d_0^j = 10 \times \frac{r}{31}$$
$$d_0^p = K_p \times d_0^i$$
$$d_0^b = Kb_b \times d_0^i$$

Perceptual quantization (PQ) can then be performed. For example, the PQ process can compute a spatial activity measure for the LCU j from four luminance frame-organized sub-blocks (n=1-4) and four luminance field-organized sub-blocks (n=5-8) using the intra (i.e. original) pixel values:

$$act_j = 1 + \min(vblk_1, vblk_2, \ldots, vblk_8),$$

where $$vblk_n = \frac{1}{64} \times \sum_{k=1}^{64} (P_k^n - P\_mean_n)^2,$$

and where $$P\_mean_n = \frac{1}{64} \times \sum_{k=1}^{64} P_k^n.$$

The term Pk are the sample values in the n-th original 8×8 block (or other suitable-sized block).

The activity measure of an LCU is denoted as $act_j$. The $act_j$ of each LCU can be normalized (denoted as $N\_act_j$) as follows:

$$N\_act_j = \frac{(2 \times act_j) + avg\_act}{act_j + (2 \times avg\_act)}$$

where avg_act is the average value of $act_j$ of the last picture to be encoded. In one example, for the first picture or LCU, avg_act can be equal to 400.

The determined quantization ($mquant_j$) for the current LCU or picture can then be determined as:

$$mquant_j = Q_j \times N\_act_j$$

where the term Qj is the reference quantization parameter obtained using rate control. In some examples, the final value of $mquant_j$ can be clipped to a particular range (e.g., from 0-51, from 0-31, or other suitable range), which can be used and coded in either a slice or an LCU.

A QP value can be transmitted (in the form of delta QP) for a coding block (e.g., an LCU or the like) for rate control and perceptual quantization purposes, as well as for other purposes in some cases. In some cases, a delta QP is transmitted only for coding blocks with non-zero transform coefficients. For instance, if a coding block has all zero transform coefficients, then a delta QP may not be coded and then signaled (e.g., in an encoded bitstream) for that coding block. One illustrative example of when a coding block can have all zero transform coefficients is when an inter-prediction skip mode is used for an LCU. The skip mode can be used to indicate that the prediction residual for the coding block is zero, in which case no residual data is present in the encoded video bitstream and thus no transform coefficients are coded and transmitted for the LCU. In one illustrative example, the skip mode can be beneficial for coding static image regions where the prediction error is very small. When an LCU is skipped, the delta QP is not encoded for that LCU, in which case there is no information available for a decoder to interpret the QP value for that LCU.

The coding device (e.g., an encoding device and/or a decoding device) can estimate prediction information (e.g., one or more motion vectors, the QP value, among other information) for a skipped coding block from neighboring coded blocks, and can use this estimated prediction information to calculate a motion compensated prediction for the skipped block. For instance, the QP value for a current LCU that is skipped (using inter-prediction skip mode) can be derived from the QP value of a previously coded LCU (e.g., the last coded LCU in raster scan order). In one illustrative example, if the QP value of the last LCU (in raster scan order) is determined to be equal to 30, the QP value for the current LCU (which is skipped) is determined to be equal to the QP value of the last LCU (i.e., equal to 30). The derived QP value can then be used by the coding device for various purposes. For example, a de-blocking filter engine of an encoding device and of a decoding device needs the QP value of a current block to perform de-blocking (as described below). In another example, to determine the coded delta QP of a current LCU, a coding device needs the base QP from the neighbor LCU to get the final QP value for the current LCU.

For example, as noted above, an encoding device (e.g., using a transform and quantization engine) can code the delta QP at the first LCU (or other coding block) of each row in a picture. In some cases, de-blocking can be performed (by an encoding device and/or by a decoding device), which includes applying an in-loop filter to a decoded video frame to improve visual quality and prediction performance by smoothing the sharp edges that can form between coding blocks when block-based coding is performed. When performing de-blocking for a given LCU, a filter engine (e.g., of an encoding device and/or a decoding device) needs the QP of the LCU. The QP used for quantizing each LCU may be known (e.g., from performance of LCU RC and/or PQ). However, when de-blocking is performed for a current LCU that has all zero quantized transform coefficients (e.g., because it was skipped or due to another coding function being applied to the LCU), there is no QP delta coded for that LCU. In such cases, the coding device needs to derive the QP value for that LCU from the last coded LCU. In some cases, the last coded LCU can be the last coded LCU in raster scan order. For example, for the first LCU in a current row of a frame, the QP value of the last LCU in the previous row of the frame can be used as the QP value of the first LCU in the current row. In such cases, the determined QP value of such an LCU (e.g., determined by LCU RC and/or PQ) can be discarded. If an LCU does not have all zero quantized transform coefficients (e.g., the LCU is not skipped or other coding function that results in all zero value coefficients is not applied), then the determined QP value of the LCU (e.g., determined by LCU RC and/or PQ) can be coded in the bitstream as a delta QP. The coded delta QP can be used by the coding device to determine the QP value for the current block, which can then be used for performing the inverse quantization for the LCU.

Various problems exist with respect to determining QP values for coding blocks of frames (or pictures). In some cases, problems can arise when a coding process has a defined processing order that causes the QP value of a previously coded LCU to be unavailable, in which case a QP value of a current LCU that is skipped cannot be derived. For example, in some instances, the QP value for a first LCU in a row of a frame cannot be determined when the LCU has all zero value quantized coefficients (e.g., due to skip mode or other coding function being used for that LCU), because the QP value from the last LCU in the previous row is not yet available. Examples of coding processes that cause the last LCU in the previous row to not be available when a first LCU in a row of a frame is being processed include synthetic tile-based processing (from H.264), multi-pipe parallel processing encoders, among others.

Figure 2:
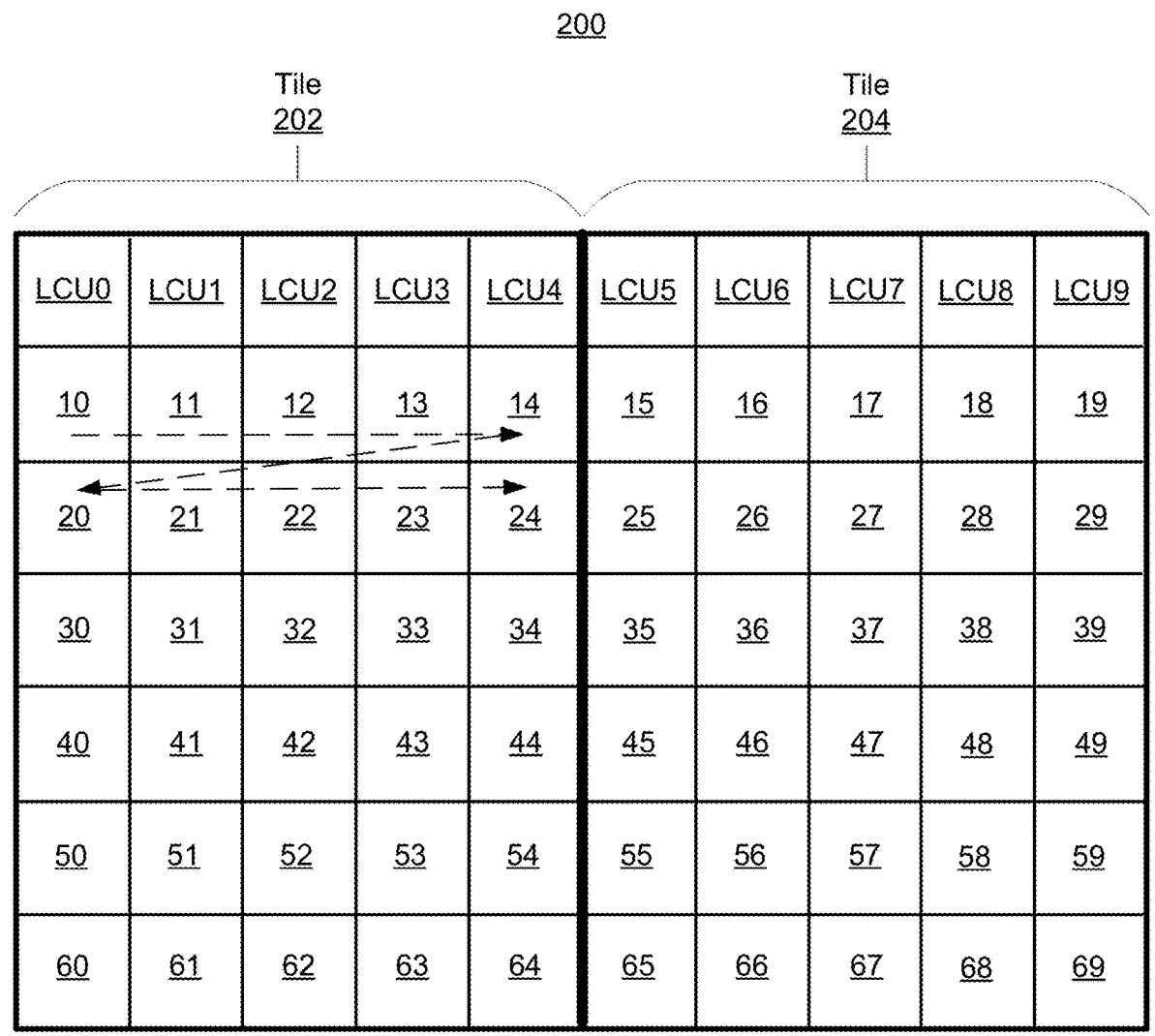
FIG. 2 is a diagram illustrating an example of a video frame with synthetic tiles, in accordance with some examples.

FIG. 2 is a diagram illustrating an example of a video frame 200 with synthetic tiles 202 and 204. While only two tiles 202 and 204 are shown, more than two tiles can be used. Tiles refer to a division of a video frame into a grid of motion-constrained rectangular regions. Tiles are not defined in the specification for H.264, and thus are referred to as synthetic tiles. Synthetic tiles are defined so that an encoder can perform tile-based processing of video frames. Referring to FIG. 2, the tile 202 and the tile 204 can be processed by an encoding device in raster scan order. For example, an encoding device can process the LCUs of the tile 202 first, followed by the LCUs of the tile 204. The LCUs within each tile can also be processed in raster scan order, as shown by the dashed arrow. The synthetic tiles are used by encoding devices to process a video frame according to the grid of rectangular motion-constrained tile regions; however, the output syntax (bitstream) is still encoded in raster scan order without considering the tiles (starting in row 1, from LCU0 to LCU 9, then to row 2, from LCU20 to LCU 29, and so on). The decoding order of the LCUs is thus in raster scan order to the end of the frame 200 because, for H.264, there is no definition of the tiles in the syntax of the bitstream from which the decoder can determine the demarcation of the tiles.

Figure 3:
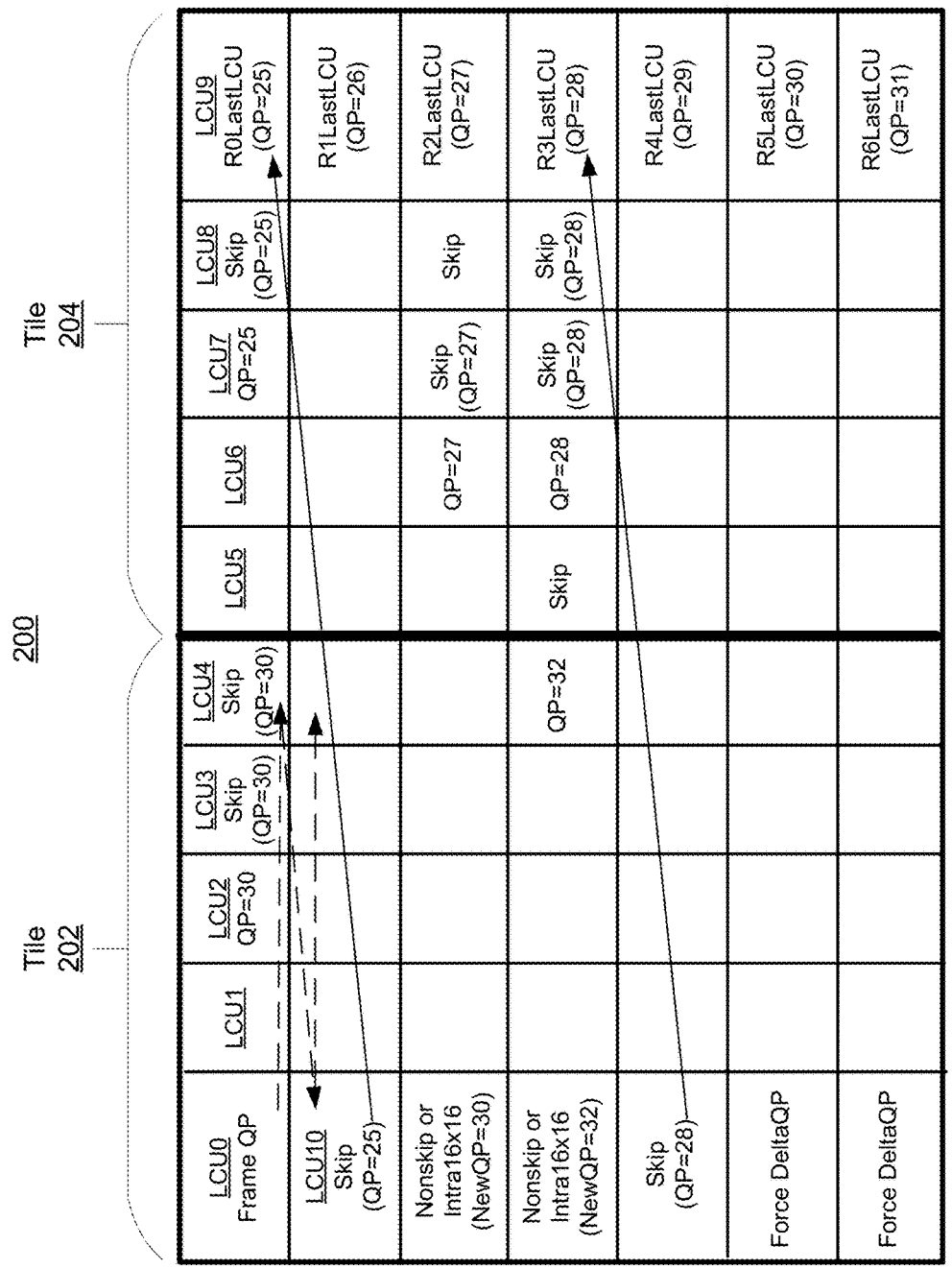
FIG. 3 is a diagram illustrating the video frame in FIG. 2 with various quantization parameter (QP) values determined for the largest coding units (LCUs) of the video frame, in accordance with some examples.

FIG. 3 is a diagram illustrating the video frame 200 with various QP values determined for the LCUs of the video frame 200. As shown, a QP value of 30 has been determined for the LCU2 in tile 202. For example, the QP value can be determined using LCU RC and/or PQ, or using another suitable technique for determining QP values. For the next three LCUs of the tile 202 in raster scan order (LCU3, LCU4, and LCU10), a skip mode is performed (illustrated by the term "skip" in each of the LCUs). As noted above, if a current LCU is skipped, the QP value for the skipped LCU is derived from a previously coded QP value (e.g., the last coded QP value). Because the LCU3 and the LCU4 were skipped, the QP values for these LCUs are derived from the QP value of the previously coded LCU, which is the LCU2 in the tile 202. The derivation of the QP value for a skipped LCU from the previously coded LCU can be performed by an encoding device during the encoding process and/or a decoding device during the decoding process.

Because the encoder processing is performed in raster scan order according to the synthetic tiles, the next LCU that is to be processed after the LCU4 is the LCU10. However, while the encoder processes the synthetic tiles in raster scan order, the QP derivation order is not performed according to the synthetic tiles. The QP derivation order is based on the frame raster scan order (without considering the synthetic tiles), meaning that the QP value for the LCU10 is derived from the last LCU9 in the prior row of the frame 200. The LCU9 is also denoted as R0LastLCU, meaning it is the last LCU in row 0. Based on the QP derivation order, a coding device (e.g., an encoding device) needs to know what the QP value is for the last LCU9 in the first row so it can use that QP value for the first LCU10 in the second row. Because synthetic tiles are used on the encoder side, the tile 202 is processed before the tile 204, meaning that the last LCU9 of the first row has not yet been processed (and thus no QP value has been determined) when LCU10 is being processed because LCU9 is included in a different tile (tile 204) than the tile (tile 202) in which the first LCU10 of the second row is located. A coding device cannot wait for the processing of the LCUS of tile 204 to finish in order to determine the QP values for the LCUs of tile 202. Thus, because the tile 204 is processed after the tile 202, a QP value cannot be derived for the skipped LCU10 because the QP value of the LCU9 is unavailable when the LCU10 is processed.

Figure 4:
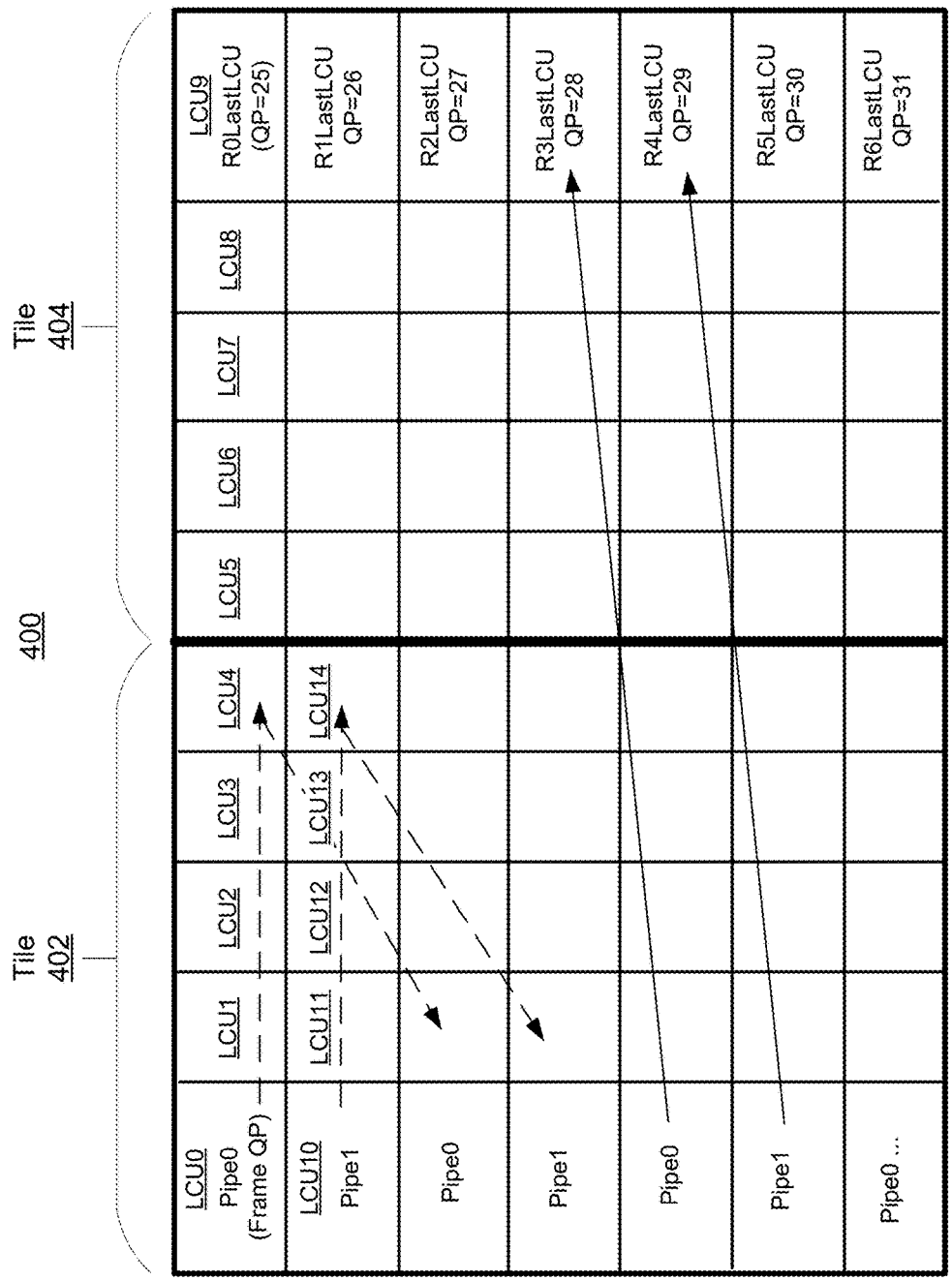
FIG. 4 is a diagram illustrating another example of a video frame with synthetic tiles processed using multi-pipe processing, in accordance with some examples.

Similar issues can arise for a multi-pipe encoder. FIG. 4 is a diagram illustrating an example of a video frame 400 with synthetic tiles 402 and 404. The example shown in FIG. 4 illustrates the H.264 synthetic tile multi-pipe process using the frame 400. A multi-pipe encoder processes (e.g., encodes) two rows (referred to as Pipe0 and Pipe1) of a frame at the same time. For example, in some cases, encoding of a Pipe0 and a corresponding Pipe1 can begin at the same time. The processing order is performed with respect to the synthetic tiles 402 and 404. For example, the raster scan order for processing the frame 400 is: LCU0, LCU1, LCU2, LCU3, and LCU4 in Pipe0 (row 0) are processed in parallel with LCU10, LCU11, LCU12, LCU13, and LCU14 in Pipe1 (row1), and so on. After the tile 402 is processed, the LCUs of the tile 404 are processed in a similar raster scan order as the LCUs of the tile 502.

The QP derivation order is performed for the entire frame 400 (without considering the synthetic tiles). For example, the order for QP derivation is: LCU0, LCU1, LCU2, LCU3, LCU4, LCU5, LCU6, LCU7, LCU8, LCU9, LCU10, LCU11, and so on. In some cases, a first LCU in a row of the frame 400 can be skipped. For example, the first LCU10 of the second row (row1) may be skipped. Because the first row (Pipe0) and the second row (Pipe1) are processed in parallel, the QP value of the last LCU9 of the first row (Pipe0) is not available when the first LCU10 of the second row (Pipe1) is being processed. Due to the last LCU9 of the first row (Pipe0) being processed after the first LCU10 of the second row (Pipe1), a QP value cannot be derived for the skipped LCU10 because the QP value of the LCU9 is unavailable when the LCU10 is processed.

Figure 5:
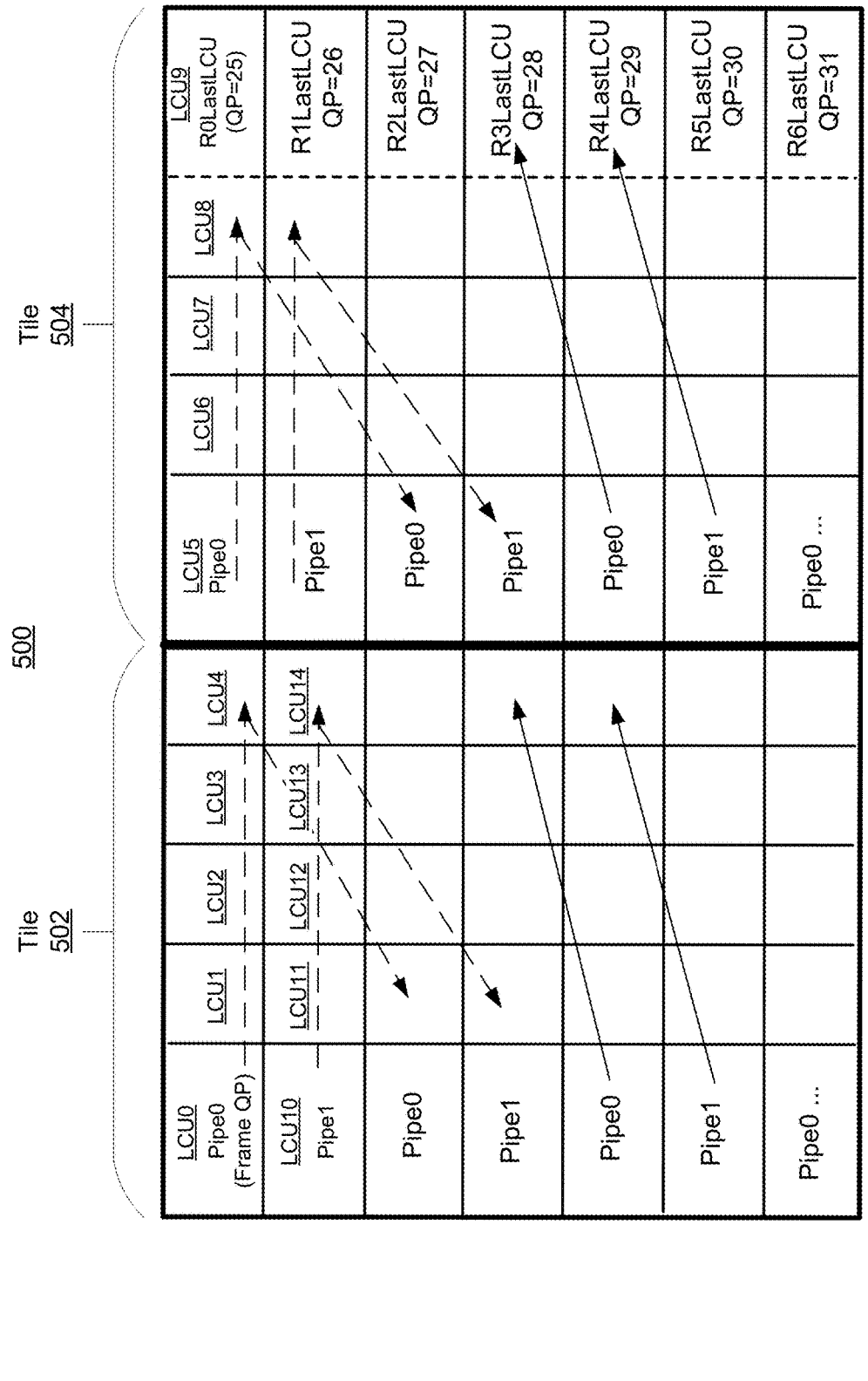
FIG. 5 is a diagram illustrating another example of a video frame with tiles processed using multi-pipe processing, in accordance with some examples.

FIG. 5 is a diagram illustrating an example of a video frame 500 with tiles 502 and 504. The example shown in FIG. 5 illustrates the HEVC tile multi-pipe process using the frame 500. Similar to AVC multi-pipe process, the processing order for the HEVC multi-pipe process is performed with respect to the synthetic tiles 502 and 504. For example, the raster scan order for processing the frame 500 is: LCU0, LCU1, LCU2, LCU3, and LCU4 in Pipe0 (row 0) are processed in parallel with LCU10, LCU11, LCU12, LCU13, and LCU14 in Pipe1 (row1), and so on. After the tile 502 is processed, the LCUs of the tile 504 are processed in a similar manner as the LCUs of the tile 502.

Because tiles are defined in the HEVC standard, the QP derivation order is performed with respect to the tiles. For example, the order for QP derivation in the first tile 502 is: LCU0, LCU1, LCU2, LCU3, LCU4, LCU10, LCU11, and so on. In some cases, a first LCU in a row of the frame 500 can be skipped. For example, the first LCU10 of the second row (row1) may be skipped. A similar problem as that described with respect to FIG. 4 can arise in such cases. For instance, because the first row (Pipe0) and the second row (Pipe1) are processed in parallel, the QP value of the last LCU4 of the tile 502 in the first row (Pipe0) is not available when the first LCU10 of the tile 502 in the second row (Pipe1) is being processed. Due to the LCU4 of the first row (Pipe0) being processed after the first LCU10 of the second row (Pipe1), a QP value cannot be derived for the skipped LCU10 because the QP value of the LCU4 is unavailable when the LCU10 is processed.

As noted above, in some cases, if there are all zero coefficient values for an LCU (e.g., when the LCU is skipped using skip mode or another coding function is performed that results in all zero coefficient values), then a delta QP is not coded for that LCU in the bitstream, and an encoder device has no information to use for deriving the QP value for the LCU. However, in some examples, a QP value can be derived for the first LCU in each row by force coding a delta QP for such LCUs, even when there are all zero coefficient values for the LCU. One example includes a force intra-prediction 16×16 mode that can be applied at the first LCU in each row. For example, force intra-prediction 16×16 mode is a special case when intra-prediction 16×16 mode is used for a first LCU in a row of a frame, in which case the encoding device will always code (i.e., force code) a delta QP value for such an LCU, regardless of whether there is a non-zero coefficient or all zero coefficients. In such cases, when intra-prediction 16×16 mode is performed for a first LCU of a row, the decoder will know which QP value was used for quantization of that LCU. On the encoder de-blocking side, the quantization QP will be used for the filtering process to avoid the use of the unknown derived QP.

FIG. 6 is a diagram illustrating an example of a video frame 600 with LCUs (shown as circles) coded using different coding modes. LCUs coded using force intra-prediction 16×16 mode are shown with circles having dotted filling therein. LCUs coded using the skip mode are shown with circles having no filling. LCUs coded using inter-prediction mode are shown as circles having solid filling. The circles having the grid filling are coded using an intra-prediction mode other than the force intra-prediction 16×16 mode (e.g., intra-prediction using a different partition than 16×16, no forced QP, or other difference).

However, picture quality issues can result when using the skip mode and the force intra-prediction 16×16 mode. For example, in cases when the QP is high, the encoder has more chances to perform the temporal inter-prediction skip mode. As shown in FIG. 6, the majority of the LCUs are coded using the skip mode (LCUs shown with no filling). As previously described, intra-prediction is a type of spatial prediction, while skip mode is a type of temporal inter-prediction mode. Temporal inter-prediction and spatial intra-prediction may cause different qualities because different QP values are used. In some cases, if spatial intra-prediction is used, the QP value will typically be lower than a QP value used for temporal inter-prediction. In some examples, the QP values can be different based on the type of LCU that is being coded (e.g., an intra-predicted LCU coded using intra-prediction, an inter-predicted LCU coded using uni-directional inter-prediction, or an inter-predicted LCU coded using bi-directional inter-prediction).

The QPs values tend to be too high for the skipped LCUs (shown with no filling), leading to a low picture quality in the areas of the picture corresponding to the skipped LCUs. For instance, the QP values for the skipped LCUs can tend to be larger than a value of 40 (e.g. out of a range of 0-51), leading to low bitrates. Such a scenario leads to intra-predicted LCUs (e.g., macroblocks, CTUs, or the like) and neighboring LCUs showing different visual qualities. Further, the intra-predicted LCUs tend to show a flickering and/or flashing effect.

Figure 7:
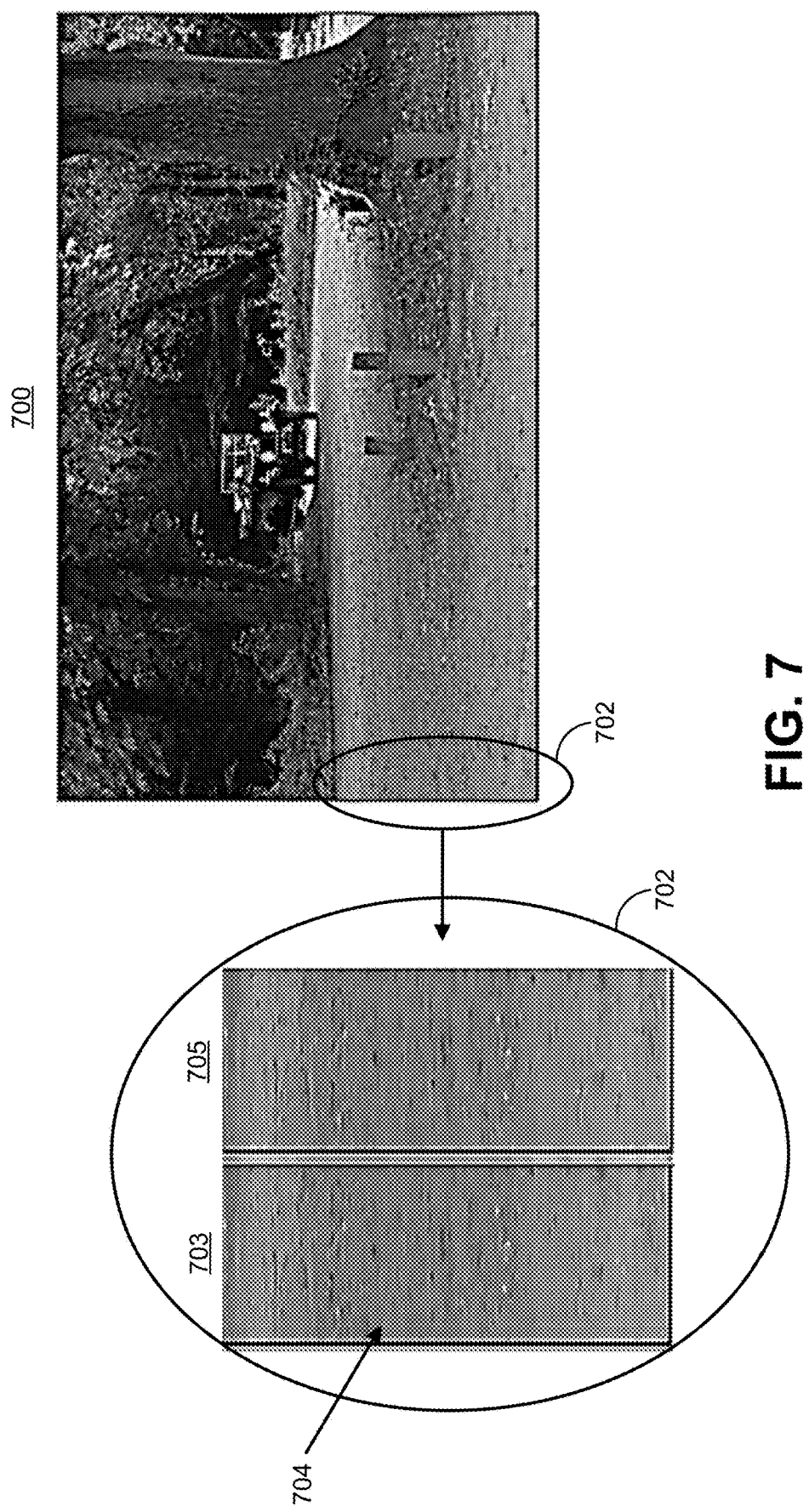
FIG. 7 is a video frame illustrating an example of the visual defects that can occur when force intra-prediction 16×16 mode is performed at the first LCU in each row, in accordance with some examples.

FIG. 7 is a video frame 700 illustrating an example of the visual defects that can occur when force intra-prediction 16×16 mode is performed at the first LCU in each row. The video data of the frame 700 can be encoded according to the H.264 standard, and LCU RC and/or Perceptual Coding can be performed. Two different versions of region 702 of the frame 700 are shown, with the first version 703 illustrating the region 702 when force intra-prediction 16×16 mode is performed at the first LCU in each row, and the second version 705 illustrating the region 702 when the systems and methods described below are performed. As shown in the first version 703, a visual artifact 704 (a vertical line) shows up in the rendered video frame 700. The visual artifact 704 can be due to the problems described above with respect to FIG. 6, including the majority of the LCUs being coded using the skip mode, the intra-predicted LCUs (e.g., macroblocks, CTUs, or the like) and neighboring LCUs having different visual qualities, the intra-predicted LCUs showing a flickering and/or flashing effect, among other possible issues. Such issues might occur more dramatically when the frame width is greater than a certain amount (e.g., greater than a width of 960 or other value).

Systems and methods are described herein for providing delta QP coding options for video data. The systems and methods can be implemented by changing the existing hardware design of coding devices (e.g., an encoding device, a decoding device, or a combined video encoder-decoder, or CODEC). For example, the hardware logic of an encoding device can be changed by modifying the existing firmware of the encoding device and/or modifying the existing algorithms used by the encoding device, which changes the functionality of the encoding device.

For example, as described in more detail below, the final QP value for a particular coding block (e.g., LCU or the like) of a video frame can be limited based on a threshold QP value. In some examples, the delta QP coding options can include a forced insertion of a non-zero coefficient (e.g., a +1 or a −1) at a transform unit (TU) corresponding to one or more color components. The forced non-zero coefficient can include a quantized coefficient, a non-quantized coefficient. In some cases, instead of adding a non-zero coefficient, a noise value can be inserted at the pixel level, and transformation and quantization can then be performed on a coding block that has the inserted noise value, resulting in forced insertion of a non-zero coefficient for the coding block. Such a limitation on the QP value and forced non-zero coefficient insertion may be applied only to certain coding blocks in some cases. For instance, in some examples, only the first LCU of each row of a frame may have its QP value limited based on the threshold QP value. Further, the non-zero coefficient can be forcibly inserted at a last TU of the first LCU of each row of the frame. Other conditions (described in further detail below) can also be put in place that limit when the forced non-zero coefficient insertion and the threshold QP-based QP determination process is performed. In some cases, the sign of the inserted non-zero coefficient can be alternated at each frame, which can counterbalance the temporal error propagation that results from frame to frame due to insertion of the non-zero coefficient.

The forced non-zero coefficient insertion and the threshold QP-based QP determination described herein solves the problems described above. For example, the problems include that a QP value cannot be derived for a first LCU (that is skipped) of a current row because the QP value of a last LCU in the previous row (or tile) is unavailable when the first LCU in the current row is processed. Such a problem is solved by forcing the insertion of a non-zero coefficient at a transform unit corresponding to a color component of the LCU. The color component can include, for example, the last chroma red (Cr) position of the TU, or any other suitable transform unit. For example, the forced non-zero coefficient insertion causes a QP delta (which is based on a final QP value equal to either the threshold QP or the QP value determined from LCU RC and/or PQ) to be coded for that LCU, whereas a QP delta is normally not coded for the LCU because all of the coefficients would otherwise be zero values because the LCU is skipped (using inter-prediction skip mode). For instance, the hardware (in addition to the software and/or firmware) of a coding device can be designed so that a QP value is first determined for the LCU using, for example, the LCU RC and/or the PQ functions. The QP value can be set as an initial QP value for that LCU. The initial QP value can be used in the forward pass of the encoding process when performing transformation and quantization for the LCU. The coding device can then compare the initial QP to the threshold QP, and can choose the lower of the two QP values as the final QP value. In addition, the non-zero coefficient can be inserted into a TU of the LCU, which causes a QP delta to be coded for the LCU. The final QP value for the LCU can then be encoded for that LCU (as a delta QP) so that the encoding device and the decoding device can have the information needed to determine the QP value for the LCU. For instance, the final QP value can be used in the inverse pass of the encoding process when performing inverse quantization and inverse transformation on the LCU to generate a reference frame (or reference picture). The final QP value can also be used by the encoding device when performing in-loop filtering, such as in the de-blocking process.

The decoding device can obtain the delta QP value encoded for the LCU, and can determine the final QP value for the LCU from the delta QP value. For example, the current LCU QP can be determined as a sum of the last LCU QP and the delta QP for the current LCU (denoted as current LCU QP=last LCU QP+delta QP). The final QP value determined for the LCU by the decoding device can be used in the inverse pass of the decoding process to perform inverse quantization and inverse transformation for the LCU when reconstructing the LCU. The decoding device can also use the QP value for performing in-loop filtering, such as de-blocking. Based on inclusion of the non-zero coefficient in the TU, the coding device (e.g., encoder and decoder) will not skip the LCU or use the previously coded QP value (due to the coefficients not including all zero values), and will instead use the final QP value derived from the QP delta coded for the LCU. Because the QP value used in the inverse pass of encoding device is the same as the QP used in the inverse pass of the decoding device, the encoder and decoder will generate similar results for the decoded LCU.

Insertion of a forced non-zero coefficient to a TU of an LCU is that noise is added to the reconstructed video frame (after the inverse coding pass). While the initial QP value determined for an LCU (e.g., based on LCU RC and/or PQ) could be used as the delta QP, a higher QP value leads to even more noise being present in the reconstructed video frame. For example, if the initial QP value is 32 (e.g., from LCU RC and/or PQ), there are all zero value quantized coefficients, and a +1 non-zero coefficient is inserted, large noise values will be present in the reconstructed frame from the inverse coding pass (e.g., see QP-TH 32 and noise values 1008D in FIG. 10D, discussed further below). However, such a large amount of noise is undesirable. Limiting the QP value used for deriving the QP delta of a current LCU reduces the noise that is introduced in the reconstructed frame. For example, if the +1 non-zero coefficient is inserted and the QP is reduced to a QP value of 16, a much smaller noise results in the reconstructed frame (e.g., see QP-TH 16 and noise values 908 in FIG. 9, discussed further below). The lower QP value helps to offset the noise introduced by adding the non-zero coefficient.

The systems and methods described herein can also change the currently existing techniques that are used when coding delta QP at the first LCU of each row or tile. For example, as described above with respect to FIG. 6 and FIG. 7, when coding delta QP at the first LCU of each row, the only option currently available is to use force intra-prediction 16×16 mode (with a forced QP delta) at the first LCU of each row. A new option is introduced herein when coding delta QP at the first LCU of each row or tile. For example, the new option allows any mode to be used for such LCUs, instead of only using force intra-prediction 16×16 mode. Other modes that can be used include inter-prediction no skip mode, intra-prediction 4×4 mode with non-zero coefficient insertion, among others. By allowing other modes, the above-described forced non-zero coefficient insertion and/or the lowering of the QP value can be performed for a first LCU of a row of a video frame.

FIG. 8A is a block diagram illustrating the forced non-zero coefficient insertion and the QP threshold-based QP determination process. FIG. 8B is a block diagram illustrating an example of a hardware update for implementing the forced non-zero coefficient insertion and the QP threshold-based QP determination process. Based on the change noted above when coding delta QP at the first LCU of each row, the mode can be any mode as opposed to using only force intra-prediction 16×16. However, a coding device can continue to use 16×16 intra-prediction, without being forced to do so. When the prediction mode for an LCU is not intra-prediction 16×16 mode, the forced non-zero coefficient insertion and the QP threshold-based QP determination can be performed.

In some examples, in addition to the prediction mode condition, the forced non-zero coefficient insertion and/or the QP threshold-based QP determination can be applied only when one or more other conditions are met. In some cases, such techniques can be applied only when a coding mode is used that results in multiple QP values being generated for a single frame. Examples of such coding modes can include the LCU RC mode and the PQ mode, which can generate unique PQ values for different LCUs in a video frame. In some cases, the techniques are only applied when all transform coefficients of the LCU have zero values, due to the problems described above with respect to such LCUs. The techniques may also only be applied when the QP value for a first LCU of a row cannot be determined based on the last LCU of the previous row. Illustrative examples of when such a situation can occur is when synthetic tiles are used and/or when a multi-pipe encoding process is performed, as described above. In some examples, the techniques are only applied when all of the above conditions are met.

For an LCU that meets one or more of the above conditions, leading to application of the forced non-zero coefficient insertion and the QP threshold-based QP determination, a zero block detection (ZBD) mode can be disabled. ZBD mode is a special mode for an encoder, which forces the coefficient values for an LCU to zero values. For example, even when there are non-zero coefficient values after quantization of the coefficients of an LCU, the ZBD function will wipe out the coefficient values so that they become zero values. The ZBD function can be disabled when the forced non-zero coefficient insertion and the QP threshold-based QP determination is to be performed. In one illustrative example, the ZBD function can be disabled when an LCU is a first LCU of a row of a video frame (or a tile), when tiles (e.g., synthetic tiles) are used and/or when multi-pipe processing is performed, and when LCU RC and/or PQ are enabled.

The forced non-zero coefficient insertion and the QP threshold-based QP determination will now be described with reference to FIG. 8A. The forced non-zero coefficient insertion and the QP threshold-based QP determination can be performed for each LCU that meets one or more of the conditions described above. The process can be performed by a transform and quantization engine of a coding device, and can be performed on the residual portion of an LCU (e.g., a residual coding block) after prediction is performed.

As shown in FIG. 8A, an initial LCU QP value for a first LCU of a row of a frame or tile is denoted as initial an LCU_QP 802. The initial LCU_QP 802 is determined from the LCU RC algorithm, the PQ algorithm, or other suitable algorithm that determines QP values for coding blocks. Different transform units (TU) of the LCU are shown. As described above, a TU (sometimes referred to as a transform block) represents a square block of samples of a color component, on which a same two-dimensional transform is applied for coding a prediction residual signal. Each TU is referenced in FIG. 8A by an index value 0-25. In some cases, an index value can be assigned to the pixel components of the LCU to indicate the TU to which each pixel component corresponds. The components of a pixel include the luma (Y) component, the chroma blue (Cb) component, and the chroma red (Cr) component. Each TU can include any suitable number of pixels. For example, according to H.264, each TU block represents a 4×4 block of samples (pixels), in which case each index value corresponds to a TU having a 4×4 block of samples. While a 4×4 block of samples is used as an example for each TU, one of skill will appreciate that any other suitable number of samples can be used for each of the TUs.

The luma TUs 804 of the LCU are assigned the index values 0-15. For example, the TU0 (with index=0) can include the luma components of a 4×4 block of samples, the TU1 (with index=1) can include the luma components of another 4×4 block of samples, and so on. Accordingly, the full set of luma TUs 804 includes a 16×16 block of samples per LCU.

Index values 16-19 are indexes to the chroma blue (Cb) AC TUs, with each index corresponding to a TU with a block of samples having the same size as the luma TUs. For example, each Cb AC TU can have a 4×4 block of samples, in which case the entire set of Cb AC TUs 806 includes an 8×8 block of samples. The index value 20 is an index to the Cb DC TU 808, which includes a block of samples having the same size as the Cb AC TUs. For example, the Cb DC TU can have a 4×4 block of samples. The AC and DC terms are described below.

Index values 21-24 are indexes to the chroma red (Cr) AC TUs. The Cr AC TUs include a block of samples having the same size as the other TUs. For example, each Cr AC TU can have a 4×4 block of samples, in which case the entire set of Cr AC TUs 810 includes an 8×8 block of samples. The index value 25 is an index to the Cr DC TU, which includes a block of samples having the same size as the Cr AC TUs. For example, the Cr DC TU can have a 4×4 block of samples.

The AC term refers to a first transform, which can be applied to the Cb AC TUs 806 and the Cr AC TUs 810 of the LCU. The DC term refers to a second transform that is applied to certain samples of each AC TU after the first transform is applied to each AC TU. For instance, the transform coefficient (generated by performing the first transform) at the zero sample position in each Cr and Cb AC TU can be extracted, resulting in one transform coefficient being extracted from each AC TU. The transform coefficient at the zero sample position in each AC TU is referred to as a DC coefficient. Using the TU16 (with index=16) as an example, when the AC transform is performed for the TU16, the result is 16 transform coefficients due to each TU having a 4×4 block of samples. The DC coefficient at the zero sample position in each Cb AC TU can then be extracted. For example, the DC coefficient from the zero sample position in TU16, TU17, TU18, and TU19 are extracted, resulting in four DC coefficients. The DC coefficients are illustrated by the block 807, which illustrates the sample positions of the Cb AC TUs 806. As shown, the DC coefficients are extracted from the "0" sample positions, which is the top-left pixel of each TU. The second transform can then be performed on the DC coefficients, resulting in the generation of the Cb DC TU 808 (with index=20). The same process is performed on the Cr AC TUs to generate the Cr DC TU 812 (with index=25).

The forced non-zero coefficient insertion and the QP threshold-based QP determination process can then be performed, as shown in block 814. For example, the transform and quantization engine of a coding device can determine if all of the quantized transform coefficients for the LCU have zero values (there are no non-zero values). Such a determination is denoted in the figure as LCU_NNZ==0. For example, all of the quantized coefficients (from the luma TUs, the Cb AC TUs, the Cb DC TU, the Cr AC TUs, and the Cr DC TU) have to be zero for this condition to be satisfied. The transform and quantization engine can then check if the initial LCU_QP 802 is greater than a threshold QP (QP_TH). If the initial LCU_QP 802 is greater than the threshold QP (QP_TH), then the final LCU_QP value (denoted as LCU_QP) will be made equal to the threshold QP (QP_TH). As noted above, this process is performed for the first LCU in each row, and if the coefficients are all zero and if the initial LCU_QP 802 is greater than the threshold QP, then the threshold QP is used for that LCU instead of the initial LCU_QP 802. If the initial LCU_QP 802 is not greater than the threshold QP (QP_TH), then the final LCU QP value will be made equal to the initial LCU_QP 802.

In some cases, the QP derivation process described above is used for calculating the luma QP value, in which case the luma QP can be set to the final LCU_QP. Referring to FIG. 8A, the highlighted TU0 (with index=0) indicates that the luma QP (denoted as Luma_qp) is updated to include the final LCU_QP (LCU_QP). In such cases, the chroma QPs can be derived from the luma QP (e.g., using a QP offset). In one illustrative example, the chroma QP values (one for the Cr component and one for the Cb component) can be derived from the luma QP value by using picture level and/or slice level offsets and a table lookup.

The forced non-zero coefficient insertion is performed whether the final LCU_QP is set to the threshold QP value or the initial LCU_QP 802 value. As previously described, after quantization is performed, if there are all zero quantized coefficients for an LCU, there will be no QP delta coded for that LCU, in which case the coding device will use a previously coded QP delta of a previously coded LCU (e.g., that was not skipped) during the inverse coding pass (e.g., during inverse quantization, inverse transformation, de-blocking, and/or the like). In some cases, it is not desirable to have all zero coefficients, such as when a prior coded LCU's QP value is not available. The transform and coding engine can force a non-zero coefficient (e.g., a +1 or a −1) for an LCU in order to ensure that a QP delta value is coded for the LCU. By inserting this non-zero coefficient, the coding device (e.g., the encoding device and the decoding device) will not skip the LCU and will know that a QP value is encoded for that LCU. In some examples, the non-zero coefficient can include an artificially inserted quantized non-zero coefficient value. In some examples, the forced non-zero coefficient can include a non-quantized non-zero coefficient, after which quantization can be performed to generate the quantized non-zero coefficient. In some examples, instead of adding a non-zero coefficient value (quantized or non-quantized), one or more noise values (a pixel value) can be inserted at the pixel level into an LCU. For example, a pre-defined noise pattern (e.g., the noise values 908 shown in FIG. 9) can be added to the pixel values of the TU of the LCU (e.g., TU[24][15], as described below). Transformation and quantization can then be performed on the LCU that has the one or more inserted noise values, resulting in forced insertion of a non-zero quantized coefficient at the TU of the LCU.

In the example shown in FIG. 8A, the notation TU[24][15]=c represents the forced non-zero coefficient insertion. The notation of TU[24][15] indicates the TU index and the sample position in the TU at which the non-zero coefficient is inserted. For example, TU[24][15] indicates that the non-zero coefficient c is inserted at the sample position 15 (the last sample position in a 4×4 sample array) within the TU24 (with index 24), which is the last Cr AC TU (highlighted in FIG. 8A). While the non-zero coefficient c is described in this example as being inserted in TU24 at sample position 15, one of skill will appreciate that the non-zero coefficient can be inserted at any sample position within any TU. The sample position at TU[24][15] operates as a good candidate for insertion of the non-zero coefficient. For example, the sample position at index 15 within TU[24] is related to a high frequency, which is less visible to human eye. The index 24 is the last 4×4 block of the LCU. By the time the last 4×4 block is processed, the coding device knows if there are naturally (not forced) any non-zero coefficients before the last TU[24], which can help to avoid inserting an artificial non-zero coefficient when one is not needed. For instance, if there is a non-zero coefficient before the TU[24][15], a QP delta will already be coded for the LCU and the forced non-zero coefficient insertion and QP threshold-based QP determination process will not be performed.

FIG. 8B is a diagram illustrating the hardware update for implementing the forced non-zero coefficient insertion and the QP threshold-based QP determination process. The residual 820 is the residual input (the residual portion of a current block). The transform engine 822 can perform the transformation. The quantization engine 824 can perform quantization and can count the non-zero coefficients (TU_NNZ) using, for example, an NNZ (non-zero coefficient) counter. In some cases, a transform and quantization engine can perform the functions of both the transform engine 822 and the quantization engine 824. The accumulation engine 826 can accumulate all of the non-zero coefficients from every TU block of a current LCU. The threshold QP (QP_TH) and the non-zero coefficient (c) can be controlled by the firmware of the coding device.

According to the techniques described above with respect to FIG. 8A and FIG. 8B, when the first LCU of a row has all coefficients quantized to 0s, and the initial QP for the LCU (determined using LCU RC mode and/or PQ mode) is larger than the threshold QP (QP_TH), a transform and quantization engine resets the LCU_QP to a lower bound equal to the threshold QP (QP_TH), and performs a forced insertion of a non-zero coefficient c (e.g., a +1 or a −1) at position 15 of the last TU of the LCU (e.g., the last 4×4 TU position of the Cr component).

In some cases, the firmware can be programmed to turn on different functions of the transform and quantization engine to effect the forced non-zero coefficient insertion and QP threshold-based QP determination process. For example, a "force non-zero coefficient flag" (denoted as ForceNZCoeff) can be turned on in certain instances to force an LCU to have non-zero coefficients inserted, which effectively triggers performance of the forced non-zero coefficient insertion and QP threshold-based QP determination process. In one illustrative example, when LCU RC or PQ is enabled and when synthetic tiles and/or multi-pipe encoding (or other feature that has similar problems) are enabled, the firmware can have an option to turn on the force non-zero coefficient flag to force the first LCU of each row to have non-zero coefficient inserted. In such examples, when the force non-zero coefficient flag is on, the lower bound QP value will be set for the non-zero coefficient insertion at the first LCU of each row. For example, if QP=30 is used for the first LCU of each row, and threshold QP is equal to 16 (TH_QP=16), the transform and quantization engine will use TH_QP=16 as the final LCU QP. A +1 or −1 non-zero coefficient can also be inserted into the designated position of a particular TU, as described above.

Figures 9, 10A, 10B, 10C, 10D:
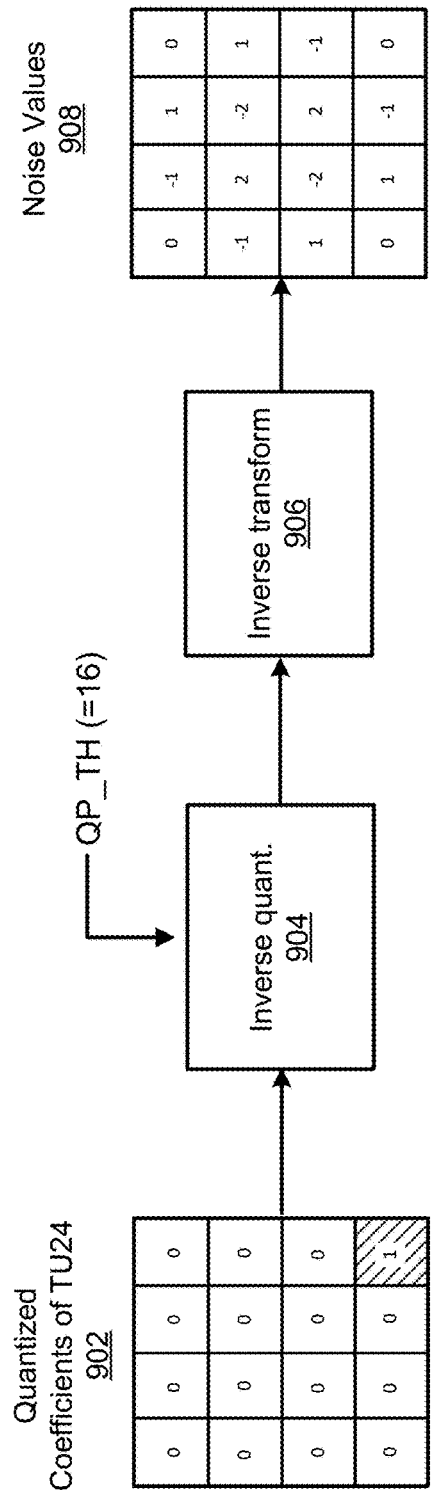
FIG. 9 is a block diagram illustrating the effect of a threshold QP value of 16 on noise, in accordance with some examples.
FIG. 10A, FIG. 10B, FIG. 10C, and FIG. 10D are diagrams showing different noise values resulting from the use of different threshold QP values, in accordance with some examples.

As noted previously, consequence of adding a forced non-zero coefficient to a TU of an LCU is that noise is added to the reconstructed video frame (after an inverse coding pass of an encoding device or decoding device). Further, the value of threshold QP used in the process can have an effect on the noise generated due to insertion the non-zero coefficient. FIG. 9 is a block diagram illustrating the effect of a threshold QP value of 16 (denoted as QP_TH(=16)) on noise. The inserted non-zero coefficient introduces noise to the reconstructed frame. For example, when inverse quantization 904 is performed on the coefficients 902 (using the final QP value) by an encoding device and/or an decoding device, and the inverse transform 906 is performed on the coefficients, the +1 non-zero coefficient inserted at the last sample position (the highlighted sample position with a "1" value) becomes pixel noise in the reconstructed picture. The noise values 908 represent the noise generated due to the non-zero coefficient and the threshold QP (QP_TH). The noise values indicate a deviation from the pixel values that would result without the noise. The closer to 0 a noise value is, the less noise that is present, where a 0 value indicates no noise.

The non-zero coefficient is needed to force a delta QP to be coded for an LCU, so the addition of the noise is tolerated. The QP threshold is an important factor in the decoding process, and can affect the noise values in the reconstructed frame. The QP threshold can be set to a pre-determined value, and can be programmed by the firmware of the coding device. For example, the QP threshold can be adjusted by changing the firmware. In some cases, multiple QP thresholds can be programmed in the firmware, and the transform and quantization engine can choose which appropriate QP threshold to use for different LCUs. FIG. 10A, FIG. 10B, FIG. 10C, and FIG. 10D are diagrams showing different noise values resulting from the use of different threshold QP values. The noise values 1008A are generated using a QP threshold value of 20 (denoted as QP_TH 20). The noise values 1008B are generated using a QP threshold value of 24 (denoted as QP_TH 24). The noise values 1008C are generated using a QP threshold value of 28 (denoted as QP_TH 28). The noise values 1008D are generated using a QP threshold value of 32 (denoted as QP_TH 32). As can be seen from the noise values 1008A-1008D, the noise values increase as the QP threshold increases. The QP threshold value can be lowered in order to reduce the noise introduced by insertion of the +1 or −1 non-zero coefficient. For example, with a QP value=16, the pixel difference is very small, whereas with a QP=32, the noise will be immediately noticeable and will introduce visual quality deficiencies in a reconstructed video frame.

In some examples, the sign of the inserted non-zero coefficient can be alternated at each frame. FIG. 11A-FIG. 11D are diagrams illustrating noise values for the same LCU across four frames. As shown, the noise values propagate across the frame 1, frame 2, frame 3, and frame 4 when only a +1 is inserted into a TU of the LCU (the sign of the non-zero coefficient is not alternated). A threshold QP value of 16 was used for the example of FIG. 11A-FIG. 11D. Each square in the block is a sample (pixel), and an entire block represents the 4×4 TU for which the coefficient was inserted (e.g., at TU and position [24][15]). As described above, after inverse quantization and inverse transform, the non-zero coefficient introduces noise. In frame 1, the coefficient is added, which introduces the noise illustrated by the noise values 1108A. For example, the LCU may have been the first LCU of a row in frame 1. For each frame after frame 1, if the LCU is coded using the skip mode, the noise from frame 1 will be accumulated from frame to frame (from frame 1, to frame 2, to frame 3, to frame 4). The noise is added to the subsequent frame because, when an LCU is skipped, that LCU inherits the QP value and coefficients from a previously decoded LCU. For frame 2, frame 3, and frame 4, the LCU is skipped, in which case the previously coded QP value and coefficient (the +1) is used for the LCU in all three frames. Due to the propagation of the noise, the noise values increase at each successive frame, as shown by the noise values 1108B, 1108C, and 1108D.

FIG. 12A-FIG. 12D are diagrams illustrating noise values that result for the same LCU across four frames when the sign of the non-zero coefficient is alternated at each frame. A threshold QP value of 16 was also used for the example of FIG. 12A-FIG. 12D. For example, a +1 can be inserted for the LCU in frame 1, a −1 can be inserted for the LCU in frame 2, a +1 can be inserted for the LCU in frame 3, and a −1 can be inserted for the LCU in frame 4. Alternating the coefficient can counterbalance the temporal error propagation that results from frame to frame.

Using the techniques described above, when various conditions are met for a given LCU, a new final QP value (based on a QP threshold QP_TH) can be generated for the LCU and a non-zero coefficient (a +1 or a −1) is inserted in a TU of the LCU. For example, as described above, when the first LCU of a row has all coefficients quantized to 0s, and the initial QP for the LCU (determined using LCU RC mode and/or PQ mode) is larger than the threshold QP (QP_TH), the transform and quantization engine resets the LCU_QP to a lower bound equal to the threshold QP (QP_TH), and performs a forced insertion of a non-zero coefficient (e.g., a +1 or a −1) at a sample position of a TU of the LCU (e.g., at position 15 of the last TU of the LCU, such as the last 4×4 TU position of the chroma red (Cr) component or other suitable position). Such techniques solve the problems described above by causing a QP delta (which is the lower of the threshold QP or the initial QP value) to be coded for that LCU, while reducing noise, whereas previous systems would not code a QP delta for a skipped LCU because all of the coefficients would have zero values. As a result, a coding device will have access to the information needed to determine a QP value for the LCU, and will not skip the LCU or use the previously coded QP value of another LCU.

Figure 13:
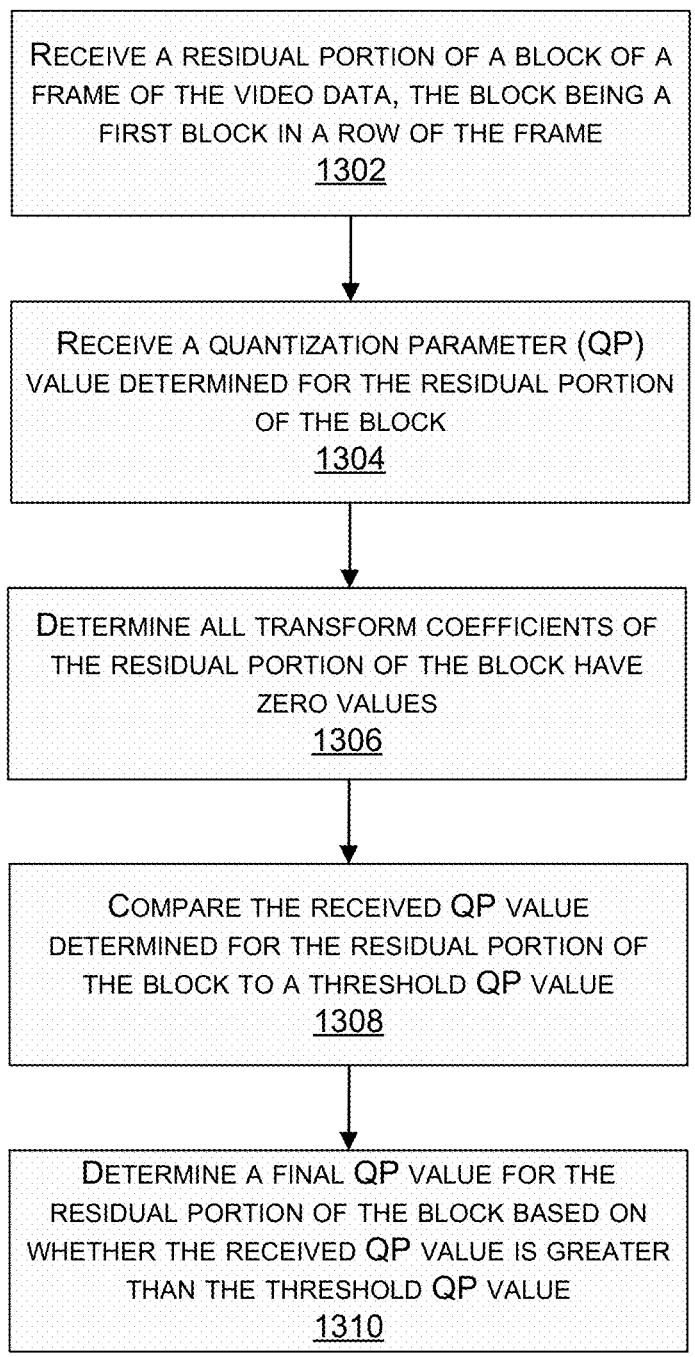
FIG. 13 is a flow diagram illustrating an example of a process of processing video data, in accordance with some examples.

FIG. 13 is a flowchart illustrating an example of a process 1300 of processing video data using one or more of the techniques described herein. At block 1302, the process 1300 includes receiving a residual portion of a block of a frame of the video data. The block is a first block in a row of the frame. The block can include a largest coding unit (LCU). For example, the block can include a coding tree unit (CTU), a coding tree block (CTB), a macroblock, or other suitable LCU. The residual portion of the block can be generated by subtracting a predictive block generated for a current block (using inter-prediction or intra-prediction) from the current block. The residual portion of the block can be included in one or more transform units (TUs).

At block 1304, the process 1300 includes receiving a quantization parameter (QP) value determined for the residual portion of the block. The QP value can be determined for the block using one or more techniques that are used to determine block-level QP values. Examples of such techniques include LCU rate control (LCU RC), perceptual quantization (PQ), or a combination thereof. Other suitable techniques can also be used to determine the QP value for the residual portion of the block. The determined QP value can be used during the forward pass of the encoding process when performing transformation (e.g., using a block transform) and quantization on the block.

At block 1306, the process 1300 includes determining all transform coefficients of the residual portion of the block have zero values. In some cases, the transform coefficients that are determined to have zero values can include quantized transform coefficients (e.g., after quantization is performed on the transform coefficients using the determined QP value). The transform coefficients can have zero values as a result of a coding mode used to encode the block. In one illustrative example, the transform coefficients of the block can have zero values due to being coded using a skip mode. The block can be encoded using any other suitable mode that results in all zero values for the transform coefficients.

At block 1308, the process 1300 includes comparing the received QP value determined for the residual portion of the block to a threshold QP value. The threshold QP value can be selected based on any suitable design characteristic. In one illustrative example, the threshold QP value can be selected in order to reduce an amount of noise that is introduced into a reconstructed video frame at a decoder side device.

At block 1310, the process 1300 includes determining a final QP value for the residual portion of the block based on whether the received QP value is greater than the threshold QP value. In some examples, the final QP value for the block is determined to be equal to the threshold QP value when the received QP value is greater than the threshold QP value. In some examples, the final QP value for the block is determined to be equal to the received QP value when the received QP value is not greater than the threshold QP value. As noted above, the determined QP value for the LCU can be used in the forward pass of the encoding process. However, the final QP value can be used during the inverse pass of the encoding process (during inverse transformation and inverse quantization when generating a reference frame or picture). The final QP value can also be used during the inverse pass of the decoding process, which uses the reference pictures (or frames) for inter-prediction, resulting in similar results being generated by the encoding device and decoding device.

In some examples, the process 1300 includes inserting a non-zero coefficient value at a transform unit (TU) corresponding to a component of the residual portion of the block. In some cases, the transform unit is the last transform unit position of the chroma red (Cr) component on the residual portion of the block. For example, the last transform unit is a transform unit having a 4×4 block of samples, or other suitable block size of samples. In one illustrative example, the last transform unit position includes the last sample position in a 4×4 sample array within the last Cr AC TU (e.g., as shown at the TU[24][15] position in FIG. 8A). One of skill will appreciate that the non-zero coefficient can be inserted at any sample position within any TU of the block.

In some cases, a sign of the non-zero coefficient value added to the last transform unit of the residual portion of the bock is alternated from frame to frame. In one illustrative example, a +1 can be inserted for the block in a first frame, a −1 can be inserted for the block in a second frame, a +1 can be inserted for the block in a third frame, a −1 can be inserted for the block in a fourth frame, and so on. Alternating the coefficient can counterbalance the temporal error propagation that results from frame to frame, as described above with respect to FIG. 11A-FIG. 11D and FIG. 12A-FIG. 12D.

In some examples, the process 1300 includes encoding the final QP value for the block into an encoded video bitstream. For instance, the final QP value for the block can be encoded into the encoded video bitstream as a delta QP value. The delta QP value indicates a difference between the final QP value for the block and a QP value of a previous block.

In some examples, the process 1300 may be performed by a computing device or an apparatus, such as the system 100 shown in FIG. 1. In some examples, the process 1300 can be performed by an encoding device 104 shown in FIG. 1 and FIG. 14. In some cases, the computing device or apparatus may include a processor, microprocessor, microcomputer, or other component of a device that is configured to carry out the steps of process 1300. For example, the computing device or apparatus can include a mobile device that includes a coding device (e.g., an encoding device or a CODEC). In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Process 1300 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 14:
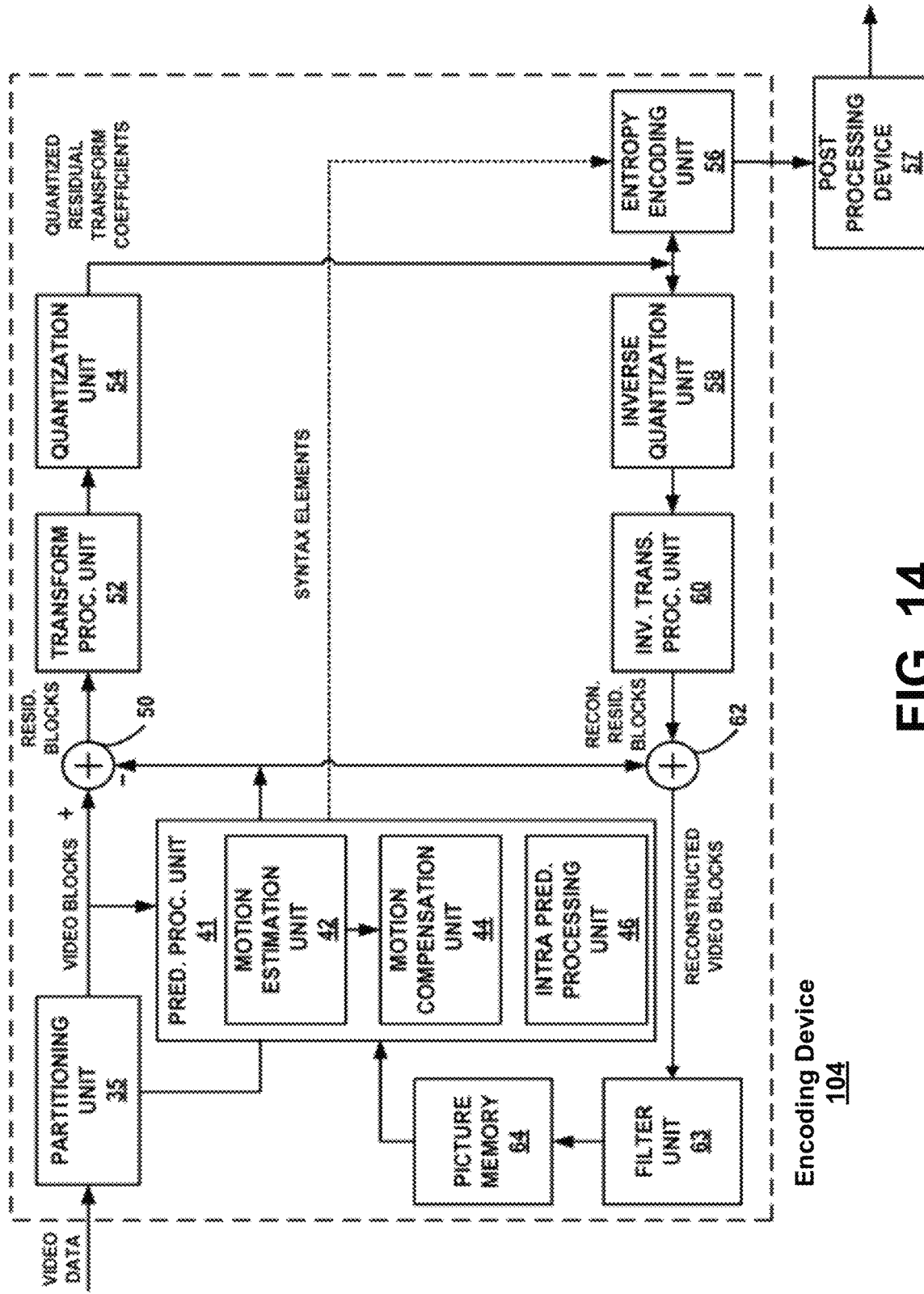
FIG. 14 is a block diagram illustrating an example video encoding device, in accordance with some examples.
Figure 15:
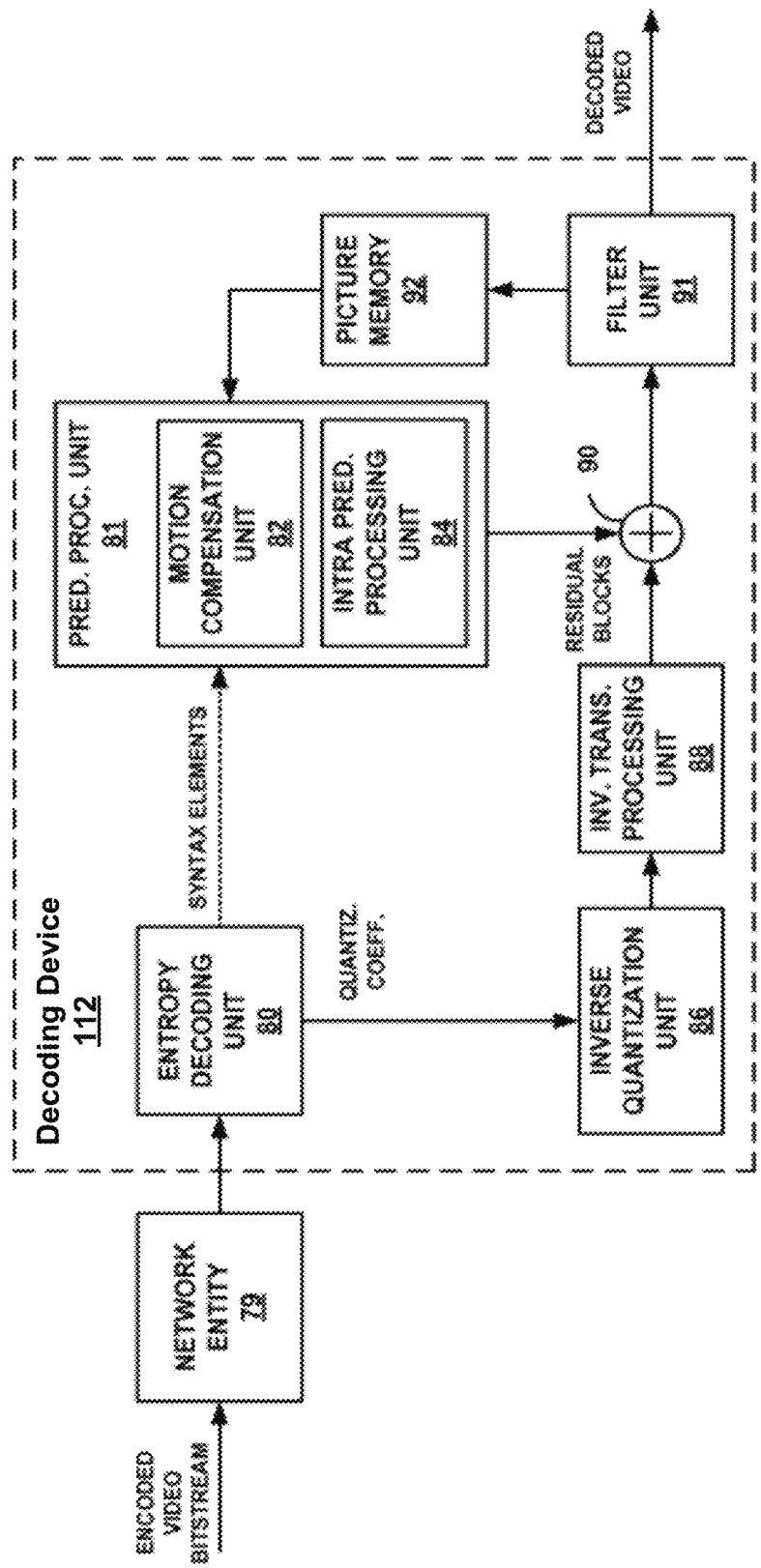
FIG. 15 is a block diagram illustrating an example video decoding device, in accordance with some examples.

Specific details of the encoding device 104 and the decoding device 112 are shown in FIG. 14 and FIG. 15, respectively. FIG. 14 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 14 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 14, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs (e.g., CTUs, macroblocks, or the like) and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bitrate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 14 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above, such as the process described with respect to FIG. 13. In some cases, some of the techniques of this disclosure may also be implemented by post processing device 57.

FIG. 15 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 14.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 15 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. In some cases, the decoding device 112 may perform any of the techniques described herein, including the processes described above, such as the process 1300 described with respect to FIG. 13.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
   receiving a residual portion of a block of a frame of the video data, the residual portion being a residual coding block, and the block of the frame being a first block in a row of the frame;
   receiving a quantization parameter (QP) value determined for the residual portion of the block;
   determining that all transform coefficients of the residual portion of the block have zero values;
   in response to the determining that all transform coefficients have zero values, determining that the received QP value determined for the residual portion of the block is greater than a threshold QP value;
   in response to the determining that the received QP value determined for the residual portion of the block is greater than the threshold QP value, setting a final QP value for the residual portion of the block to a value that is lower than the received QP value determined for the residual portion of the block; and
   in response to the determining that all transform coefficients have zero values, inserting a non-zero coefficient value by changing the zero value of a transform coefficient of the residual portion of the block to the non-zero coefficient value, wherein the transform coefficient is within a transform unit of the residual portion of the block.

2. The method of claim 1, wherein the value that is lower than the received QP value determined for the residual portion of the block is a lower bound QP value.

3. The method of claim 2, wherein the lower bound QP value is the threshold QP value.

4. The method of claim 1, wherein the inserting a non-zero coefficient value is performed by inserting a non-zero coefficient value at a last sample position of a transform unit of the chroma red (Cr) component of the residual portion of the block.

5. The method of claim 1, wherein a sign of the non-zero coefficient value inserted at the transform unit is alternated from frame to frame.

6. The method of claim 1, further comprising encoding the final QP value for the residual portion of the block into an encoded video bitstream.

7. The method of claim 6, wherein the final QP value for the residual portion of the block is encoded into the encoded video bitstream as a delta QP value, the delta QP value indicating a difference between the final QP value for the residual portion of the block and a QP value of a residual portion of a previous block.

8. The method of claim 1, wherein the block of the frame of video data includes a largest coding unit (LCU).

9. The method of claim 1, wherein the block of the frame of video data includes a coding tree unit (CTU).

10. An apparatus for processing video data, comprising:
    a memory configured to store the video data; and
    a processor configured to:
      receive a residual portion of a block of a frame of the video data, the residual portion being a residual coding block, and the block of the frame being a first block in a row of the frame;
      receive a quantization parameter (QP) value determined for the residual portion of the block;
      determine that all transform coefficients of the residual portion of the block have zero values;
      in response to the determination that all transform coefficients have zero values, determine that the received QP value determined for the residual portion of the block is greater than a threshold QP value;
      in response to the determination that the received QP value determined for the residual portion of the block is greater than the threshold QP value, set a final QP value for the residual portion of the block to a value that is lower than the received QP value determined for the residual portion of the block; and
      in response to the determination that all transform coefficients have zero values, insert a non-zero coefficient value by changing the zero value of a transform coefficient of the residual portion of the block to the non-zero coefficient value, wherein the transform coefficient is within a transform unit of the residual portion of the block.

11. The apparatus of claim 10, wherein the value that is lower than the received QP value determined for the residual portion of the block is a lower bound QP value.

12. The apparatus of claim 11, wherein the lower bound QP value is the threshold QP value.

13. The apparatus of claim 10, wherein the processor is further configured to insert the non-zero coefficient value by inserting a non-zero coefficient value at a last sample position of a transform unit of the chroma red (Cr) component of the residual portion of the block.

14. The apparatus of claim 10, wherein a sign of the non-zero coefficient value inserted at the transform unit is alternated from frame to frame.

15. The apparatus of claim 10, wherein the processor is further configured to encode the final QP value for the residual portion of the block into an encoded video bitstream.

16. The apparatus of claim 15, wherein the final QP value for the residual portion of the block is encoded into the encoded video bitstream as a delta QP value, the delta QP value indicating a difference between the final QP value for the residual portion of the block and a QP value of a residual portion of a previous block.

17. The apparatus of claim 10, wherein the block of the frame of video data includes a largest coding unit (LCU).

18. The apparatus of claim 10, wherein the block of the frame of video data includes a coding tree unit (CTU).

19. The apparatus of claim 10, further comprising a camera for capturing one or more video frames, the one or more video frames including the frame of the video data.

20. The apparatus of claim 10, wherein the apparatus comprises a mobile device with a camera for capturing one or more video frames, the one or more video frames including the frame of the video data.

21. A non-transitory computer-readable medium having stored thereon instructions that, when executed by one or more processors, cause the one or more processors to:
   receive a residual portion of a block of a frame of video data, the residual portion being a residual coding block, and the block of the frame being a first block in a row of the frame;
   receive a quantization parameter (QP) value determined for the residual portion of the block;
   determine that all transform coefficients of the residual portion of the block have zero values;
   in response to the determination that all transform coefficients have zero values, determine that the received QP value determined for the residual portion of the block is greater than a threshold QP value;
   in response to the determination that the received QP value determined for the residual portion of the block is greater than the threshold QP value, set a final QP value for the residual portion of the block to a value that is lower than the received QP value determined for the residual portion of the block; and
   in response to the determination that all transform coefficients have zero values, insert a non-zero coefficient value by changing the zero value of a transform coefficient of the residual portion of the block to the non-zero coefficient value, wherein the transform coefficient is within a transform unit of the residual portion of the block.

22. The non-transitory computer-readable medium of claim 21, wherein the value that is lower than the received OP value determined for the residual portion of the block is a lower bound OP value.

23. The non-transitory computer-readable medium of claim 22, wherein the lower bound OP value is the threshold QP value.

24. The non-transitory computer-readable medium of claim 21, wherein the instructions that, when executed by the one or more processors, cause the one or more processors to insert the non-zero coefficient value by inserting a non-zero coefficient value at a last sample position of a transform unit of the chroma red (Cr) component of the residual portion of the block.

25. The non-transitory computer-readable medium of claim 21, wherein a sign of the non-zero coefficient value inserted at the transform unit is alternated from frame to frame.

26. The non-transitory computer-readable medium of claim 21, further comprising instructions that, when executed by the one or more processors, cause the one or more processors to encode the final QP value for the residual portion of the block into an encoded video bitstream.

27. The non-transitory computer-readable medium of claim 26, wherein the final QP value for the residual portion of the block is encoded into the encoded video bitstream as a delta QP value, the delta QP value indicating a difference between the final QP value for the residual portion of the block and a QP value of a residual portion of a previous block.

* * * * *